United States Patent
Perry et al.

(10) Patent No.: US 10,706,566 B2
(45) Date of Patent: Jul. 7, 2020

(54) DETERMINING X,Y,Z,T BIOMECHANICS OF MOVING ACTOR WITH MULTIPLE CAMERAS

(71) Applicant: SportsMEDIA Technology Corporation, Durham, NC (US)

(72) Inventors: Mark Perry, San Jose, CA (US); Joshua Spivak, San Francisco, CA (US); Ryan A. Zander, Burlingame, CA (US); Graham Wei-Feng Goldbeck, Oakland, CA (US); James G. Painter, Palo Alto, CA (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 43 days.

(21) Appl. No.: 16/027,659

(22) Filed: Jul. 5, 2018

(65) Prior Publication Data
US 2018/0315202 A1    Nov. 1, 2018

Related U.S. Application Data

(63) Continuation of application No. 14/687,791, filed on Apr. 15, 2015, now Pat. No. 10,019,806.

(51) Int. Cl.
*G06T 7/292*    (2017.01)
*H04N 5/232*    (2006.01)
*H04N 5/247*    (2006.01)

(52) U.S. Cl.
CPC .......... *G06T 7/292* (2017.01); *H04N 5/23229* (2013.01); *H04N 5/247* (2013.01);
(Continued)

(58) Field of Classification Search
CPC .................................................. G06T 7/292
See application file for complete search history.

(56) References Cited

U.S. PATENT DOCUMENTS 7,094,164 B2 *   8/2006   Marty ............... A63B 24/0021
                                                       473/416
7,602,301 B1 *  10/2009   Stirling ............... A61B 5/1127
                                                       340/573.1
(Continued)

OTHER PUBLICATIONS

T. Nunner, O. Sidla. G. Paar, B. Nauschnegg: "On-Line Measurement of Ski-Jumper trajectory: combining Stereo Vision and Shape Description", Proc. SPIE 7539, Intelligent Robots and Computer Vision XXVII: Algorithms and Techniques, 753908, vol. 7539, Jan. 18, 2010 (Jan. 18, 2010), pp. 1-12, XP040547556, DOI: 10.1117/12.838141.

(Continued)

Primary Examiner — Rowina J Cattungal
(74) Attorney, Agent, or Firm — NEO IP

(57) ABSTRACT

A plurality of high speed tracking cameras is pointed towards a routine hovering area of an in-the-field sports participant who routinely hovers about that area. Spots within the hovering area are registered relative to a predetermined multi-dimensional coordinates reference frame (e.g., Xw, Yw, Zw, Tw) such that two-dimensional coordinates of 2D images captured by the high speed tracking cameras can be converted to multi-dimensional coordinates of the reference frame. A body part recognizing unit recognizes 2D locations of a specific body part in the 2D captured images and a mapping unit maps them into the multi-dimensional coordinates of the reference frame. A multi-dimensional curve generator then generates a multi-dimensional motion curve describing motion of the body part based on the mapped coordinates (e.g., Xw, Yw, Zw, Tw). The generated multi-dimensional motion curve is used to discover cross correlations between play action motions of the in-the-field sports participant and real-world sports results.

20 Claims, 6 Drawing Sheets

(52) U.S. Cl.
CPC ............ *G06T 2200/04* (2013.01); *G06T 2207/10012* (2013.01); *G06T 2207/10016* (2013.01); *G06T 2207/30196* (2013.01); *G06T 2207/30221* (2013.01); *G06T 2207/30241* (2013.01)

(56) References Cited

U.S. PATENT DOCUMENTS

| | | | |
|---|---|---|---|
| 8,335,345 B2 | 12/2012 | White et al. | |
| 8,705,799 B2 | 4/2014 | White et al. | |
| 2006/0204045 A1* | 9/2006 | Antonucci | G06K 9/00342 382/107 |
| 2008/0219509 A1* | 9/2008 | White | A63B 24/0003 382/107 |
| 2008/0291272 A1 | 11/2008 | Krahnstoever et al. | |
| 2010/0030350 A1* | 2/2010 | House | A63B 24/0021 700/91 |
| 2010/0303303 A1* | 12/2010 | Shen | G06K 9/00335 382/107 |
| 2011/0305369 A1* | 12/2011 | Bentley | G06K 9/00342 382/103 |
| 2014/0320667 A1* | 10/2014 | Densham | H04N 5/247 348/169 |
| 2015/0186609 A1* | 7/2015 | Utter, II | A61B 5/0022 600/301 |
| 2016/0267663 A1* | 9/2016 | Sicking | G06K 9/00261 |
| 2016/0307335 A1 | 10/2016 | Perry et al. | |

OTHER PUBLICATIONS

Zhou et al: "Human motion tracking for rehabilitation—A survey", Biomedical Signal Processing and Control, Elsevier, Amsterdam, NL, vol. 3. No. 1, Oct. 31, 2007 (Oct. 31, 2007), pp. 1-18, XP022476744, ISSN: 1746-8094. DOI; 10.1016/J.BSPC.2007.09.001.

* cited by examiner

100

200

400

500

600

DETERMINING X,Y,Z,T BIOMECHANICS OF MOVING ACTOR WITH MULTIPLE CAMERAS

CROSS REFERENCES TO RELATED APPLICATIONS

This application is related to and claims priority from the following U.S. patents and patent applications. This application is a continuation of U.S. application Ser. No. 14/687,791, filed Apr. 15, 2015, which is incorporated herein by reference in its entirety.

BACKGROUND OF THE INVENTION

1. Field of the Invention

The present invention relates to four-dimensional biomechanical model generation for sports participants, and more specifically determining X,Y,Z,T biomechanics of a moving actor with multiple cameras.

2. Description of the Prior Art

It is generally known in the prior art to provide systems for recording and tracking sports participants at live sport events.

Prior art patent documents include the following:

US Pub. No. 2010/0030350 for "System and method for analyzing data from athletic events" by House, filed Jun. 23, 2009 and published Feb. 4, 2010 describes embodiments of this invention relate to generating information from an athletic event. In an embodiment, a method includes receiving an aspect of a first object and an aspect of a second object in an athletic event. In some cases, objects may be athletes, balls, pucks, game officials, goals, defined areas, time periods or other sports related objects. Aspects may include but are not limited to, a location, motion, pose, shape or size. The method further includes determining a data representation based on the aspect of the first object relative to the aspect of the second object. In some cases, data representations may be stored in a data server. In other cases, data representations may be displayed. In another embodiment, a system includes an object tracker and a data manager. Aspects may be recorded using a sensor system.

US Pub. No. 20008/0219509 for "Tracking an object with multiple asynchronous cameras" by White, filed Mar. 19, 2007 and published Sep. 11, 2008, describes the path and/or position of an object is tracked using two or more cameras which run asynchronously so there is need to provide a common timing signal to each camera. Captured images are analyzed to detect a position of the object in the image. Equations of motion for the object are then solved based on the detected positions and a transformation which relates the detected positions to a desired coordinate system in which the path is to be described. The position of an object can also be determined from a position which meets a distance metric relative to lines of position from three or more images. The images can be enhanced to depict the path and/or position of the object as a graphical element. Further, statistics such as maximum object speed and distance traveled can be obtained. Applications include tracking the position of a game object at a sports event.

US Pub. No. 2016/267663 for "Systems and methods for analyzing sports impacts" by Sicking, filed Nov. 14, 2014 and published Sep. 15, 2016, describes in one embodiment, a method for analyzing sports impacts includes capturing video of game play from multiple locations using video cameras, tracking the heads of players of the games in the video, computing motion parameters of the heads, and determining if one or more of the motion parameters exceeds a threshold established for that parameter.

SUMMARY OF THE INVENTION

There are many applications in which it is useful to track and record moving objects and/or moving persons while they are in a live event environment. For example, cars and people may be tracked in security surveillance applications, the trajectory of a baseball may be tracked during a live baseball game, and corresponding performances of players during live sporting events may be video recorded and combined with the tracking information to enhance video presentations and reviews of play action events.

Typically, such object/person tracking techniques use two or more in-the-field and identical cameras whose starts of frames and starts of scan lines are, at least in theory, precisely synchronized to one another so as to capture respective images of the target at identically timed (same instances) of frames and scan lines but from different points of view. In theory, such precisely synchronized images may be used to determine or estimate three-dimensional (3D) positions of the focused-upon moving object and/or person (targets) over time where the determined three-dimensional rendition is based on the two-dimensional (2D) image projections of the targets as depicted in the precisely synchronized scan line feeds obtained from the respective and differently aimed cameras. However, in real world situations, the precise synchronizing of such in-the-field cameras at minimum can be cumbersome, time consuming and prone to error if not impossible. For example, in one approach, a high resolution, noise-free clock signal must be made available simultaneously at each of the cameras, e.g., using a technique referred to as "genlocking" in the broadcast industry and that precisely-synchronized at every location "genlock" signal must be used to continuously force (to jam start) identical start of frame times in all the cameras. Even if that is done, there is no guarantee that the horizontal scan clocks of the cameras will be identical and that their respective image scanning lines will be precisely synchronized. In other words, "genlocking" has its limitations. In addition to the extra equipment which is needed for genlocking, e.g., cables and connectors, and the labor required to provide a precisely phased, noise-free genlock clock signal to perhaps far apart locations within a live event environment, another problem is that failures can be difficult to detect until it is too late. As a result, the quality of the resulting 3D renditions can be questionable. One subtle way in which the synchronization can fail is when the signal path of the clock signal provided to the in-the-field cameras has improper termination. This can cause signal reflections and signal delays, effectively destroying the required precision of synchronization.

An additional drawback to genlock-wise synchronized multi-camera target tracking is the sheer amount of high resolution video data that is generated and that needs to be stored for indefinite lengths of time because users never know for sure when they may wish to replay parts or all of the collected video and use the same for performance analysis. Moreover, interpretation of the replayed video often calls for manual observation and subjective judgment as to quality and details of player and/or object motion, which can be a costly and error prone endeavor.

It is to be understood that this description of related technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

The present disclosure addresses the above and other issues by providing an automated system and method that can be used for recording in-the-field, live action positions and/or motions of one or more of in-the-field sports participants where the recordings can be transformed into rendering of four-dimensional (4D: for example x, y, z and t parameters) player-biomechanical models, where the in-the-field recording method uses cameras that are not necessarily identical to one another and are not necessarily precisely synchronized to one another down to the level of simultaneously started frames and simultaneously started scan lines. Rather than starting with a need for precise alignment at the image capturing end of the image-to-model transformation process, the present disclosure recognizes that the respective transformations from each 2D image capturing camera to the final four-dimensional (4D) object model should converge on having all sample points in the ultimate 4D model simultaneously operating in accordance with a single time axis and respective single frame of spatial coordinates (e.g., x, y and z) while additionally those sample points should be in compliance with various physical laws of nature including for example laws of biomechanics (e.g., fixed bone distance between elbow joint and shoulder joint). In one embodiment, a time synching code is fed to all the cameras so that respective frames and/or scan lines of those cameras can be annotated with respective start and/or end times even if those frames and/or scan lines are not precisely in synch with one another. In another embodiment, no time synching code is fed to at least some of the cameras and those cameras are allowed to freely operate asynchronously relative to others of the utilized cameras.

One embodiment generates biomechanical motion models of the videoed players and stores the modeled biomechanics in a queriable database (DB). The database may further store corresponding sports results (e.g., indicating if an identified pitcher whose motions were tracked and modeled, struck out the baseball batter or not) as well as storing data about surrounding field effects (e.g., a cheering spectator crowd) and data about in-the-field biometric attributes (e.g., heart rates) of the respective sports participants. The various stored items of the database are logically linked to the modeled biomechanics so that correlations between stored data sets, and in particular between specific motions or positions of the modeled players and corresponding game results, can be found using database mining techniques. The found correlations can be used during inter-game training for improving the in-the-field live performances of the sports participants. The above is to be contrasted with in-the-laboratory modeling of player motions where the attributes of in-the field live action are hard to replicate and the resulting modeling information is not likely to be indicative of live, in-the-field performance.

In one embodiment, a method for generating a biomechanical model of an in-the-field moving sports participant includes determining positions and motions of body parts of the moving player (e.g., elbow positions, elbow velocities) by receiving in-the-field, live play action images of the player from multiple high speed cameras at different time points during a play-action time interval, where the cameras capture their respective, line scanned images asynchronously (even if annotated by a shared time synching code) and inconsistencies between the respective images are resolved based on biomechanical and/or other physical rules of nature. The method includes using the captured 2D images to construct a unified four-dimensional moving model of the in-the-field sports participant (e.g., a skeletal model) where the unified four-dimensions include time (t) and can further include as a nonlimiting example, a predetermined X, Y and Z frame of reference. The method further includes cross associating points of motion stored for the model with various environmental conditions and results, for example by logically linking certain movements or positions (e.g., elbow positions, elbow velocities of a baseball pitcher) to positive or negative game results. Later, the database may be queried to find useful cross-correlations between player motions and/or positions versus game outcomes so as to determine which cross correlates with the other, if at all. More specifically and for sake of example, the captured 2D images can be those of video footage segments of a sporting event where certain players (e.g., baseball pitcher, baseball batter, hockey goal tender) tend to hover about relatively fixed areas in the field of play and where the focused-upon players tend to employ repetitive movements (e.g., pitching a baseball, lobbing a penalty basketball shot from the foul line, defending a hockey goal area) while hovering about their areas of typically repetitive movements (e.g., about the baseball pitcher's mound). Statistics about the repetitive motions and examinations of their details and discovery of significant cross correlations can be obtained from use of the disclosed system. Reports can be generated to indicate for example, whether a specific baseball pitcher performs best if he plants his back foot in a first location on the pitching mound and simultaneously raises his throwing elbow above a second location before commencing his pitch. A biomechanical model of the moving player can depict interrelated aspects of the player's motions and/or environmental surroundings, thus providing useful statistics regarding possible cross correlations between environment and/or positions and/or motions to corresponding game results where these can be later used for training and performance improvement purposes.

In one embodiment, multiple high speed tracking cameras are operated (e.g., semi asynchronously, meaning with use of a time synch code signal) from different positions and while aimed to have different frames of reference so as to captured images of a targeted moving player during an in-the-field sports event. The captured camera images are fed to a processing facility which: a) receives the captured images from the cameras, b) determines three-dimensional positions and movements of respective body parts (e.g., elbows, ankles, wrists) of the moving player based on the received images, and c) generates coefficients of equations that describe smooth and physics based biomechanical motions of the moving player based on the determined three-dimensional positions.

In one embodiment, at least one processor-readable storage device has data processor readable and executable code embodied therein for programming at least one data processor to perform the above-described method.

In one embodiment, a method for determining the biomechanical coefficients of a moving in-the-field sports participant includes receiving at least first, second and third images of the moving participant from multiple cameras positioned about the field of play, where the cameras capture their respective images at a speed greater than 30 frames per second, for example at 240 frames per second (240 f/s) or faster.

In other embodiments, correspondingly appropriate systems and processor readable storage devices are provided.

DETAILED DESCRIPTION

The present disclosure provides a system and method for modeling the biomechanics of one or more in-the-field sports participants while using a plurality of in-the-field and differently positioned cameras that are not necessarily all genlocked one to another. These plural cameras may be free running and may use their internal clocks for determining their respective image capture rates (e.g., frames per second, phasing of start of each frame and phasing of start of each image scan line). In one embodiment, the respective frames and/or image scan lines are tagged with a shared time synchronizing code signal. Thus, the cameras can capture images on a substantially free-running basis without being encumbered by a need for force synchronizing (e.g., force jamming) the starts of their respective frames to a common genlock synchronization clock that has to be distributed noise-free and in phase to far apart in-the-field positions. In one embodiment, each of the high speed motion tracking cameras operates at a speed substantially greater than 30 frames per second (F/s), for example at least at 120 F/s and more preferably at 240 F/s or faster. In one embodiment, each of the high speed motion tracking cameras provides a signal indicating a local timing measurement of its frame-to-frame spacing so that the temporal relationship between the frames of that camera are known to a relatively high degree of precision (e.g., to milliseconds or finer). Accordingly, when a plurality of successive frames from a same camera are received, the temporal spacing between the frames of that series is known to a relatively high degree of precision. Additionally, as mentioned, in one embodiment, the respective frames and/or image scan lines of the respective cameras are tagged with a shared time synchronizing code signal.

Figure 1:
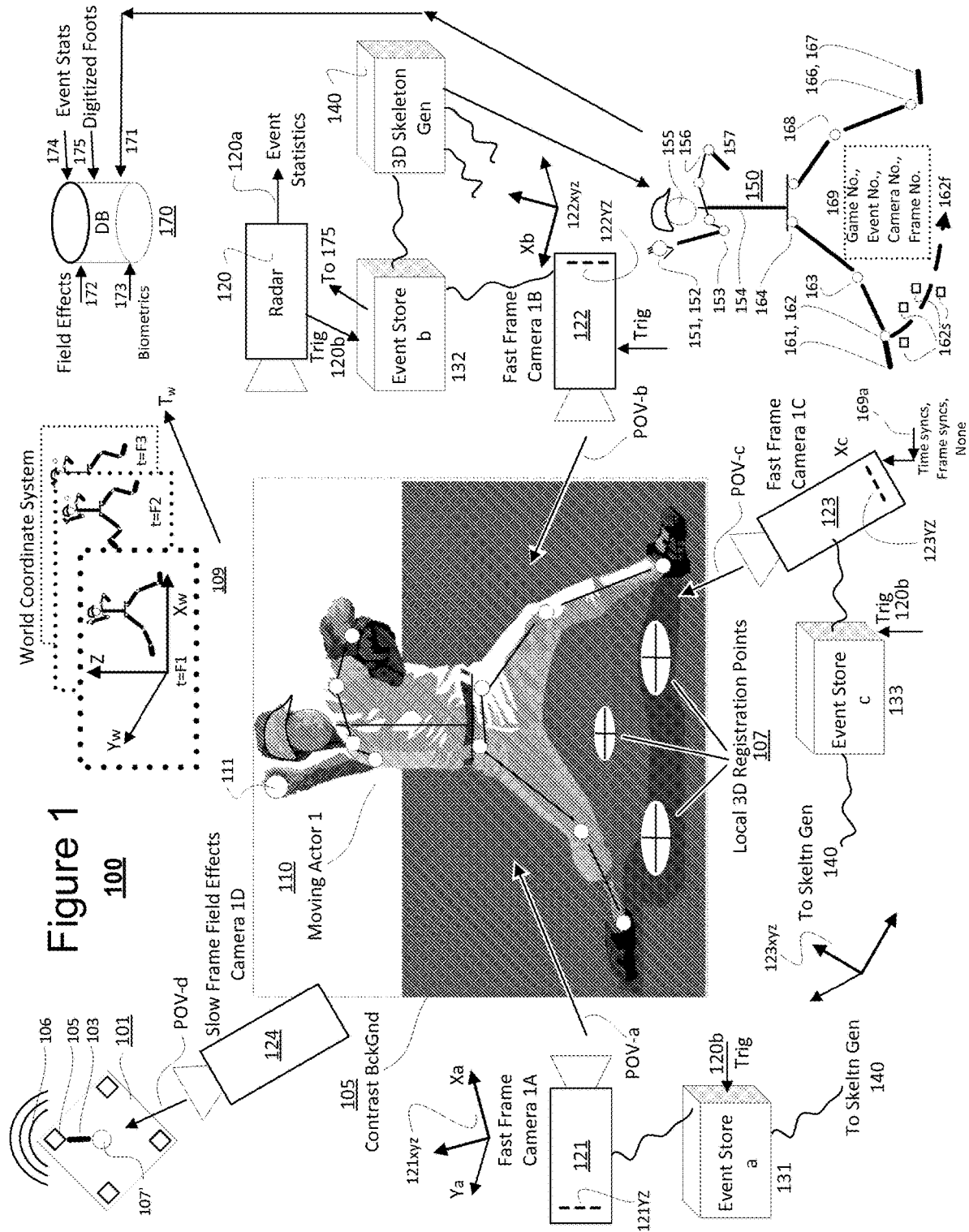
FIG. 1 depicts an in-the-field sports participant and a multi-camera system for tracking the positions and movements of body parts of the sports participant relative to in-the-field spatial reference points and generating a multi-dimensional (4D), biomechanically-based moving model of the participant based on video feeds from the multiple cameras.

FIG. 1 schematically depicts a system 100 configured for tracking an in-the-field, first sports participant (moving actor) 110 while the latter is participating in a live in-the-field sports event within a pre-specified event facility 101 (e.g., baseball field). In one embodiment, not only is the first participant 110 tracked, but also a game object such as a baseball 111 is also tracked as it is thrown from a pitcher's mound area 107' to a batter's plate (home plate) 105 within the event facility (e.g., baseball stadium 101). It will be appreciated that although the sport of baseball is used here as an example, many other applications are possible in which an actor (110) performs relatively repetitive motions in a relatively limited area where that limited area is a pre-registered area (107') having local position registration spots 107 whose locations and dimensions are predetermined relative to a common or "world" coordinates frame 109 which includes for example, Cartesian axes Xw, Yw and Zw as well a "world" time clock Tw. The "world" coordinates of specific registration spots 107 within the pre-registered area (107') may be established for example by use of pre-event planted fiducial objects whose images are captured by pre-paced cameras (e.g., high speed tracking cameras 121-123). Among the examples of other usages, the surveillance and modeling process can track the movements of a golfer at a pre-registered tee off spot and a trajectory of a golf ball departing from that spot, or it can track the movements of a goal keeper and a hockey puck approaching a pre-registered goal frontage area or it can track the movements of another in-the-field sports participant and behavior of another sports-related object (e.g., a basketball player at the penalty or foul line while shooting a penalty shot or a football placekicker at a kick off position after his team has scored a goal).

In the illustrated example, the event facility 101 includes a baseball diamond infield having a pitcher's mound (area) 107' and a home plate 105. A path 103 depicts the general trajectory of a baseball thrown from the pitcher to a catcher positioned behind home plate 105. As indicated in the enlarged image of the pitcher 110 and pitcher's mound area 107, three or more registration spots have been surveyed and registered with respect to position and apparent 2D size before the sports event and in relation to a predefined three-dimensional (3D) "world" coordinates frame 109. In one embodiment, the origin of the 3D "world" coordinates frame 109 is at the center of home plate 105. Registration includes a process of obtaining respective frame transformation matrices which provide a conversion between a respective image capture coordinate system (e.g., 121xyz, 122xyz, 123xyz in FIG. 1) of each respective tracking camera (e.g., 121, 122 and 123 of FIG. 1) and the world coordinate system 109. Because it is known what the world coordinate system coordinates are of the at least three pre-registered reference spots 107 about the pitcher's mound, each time a camera is aimed to include those reference spots 107 in its 2D image, a conversion can be carried out from the pixel coordinates of the 2D image to the 3D coordinates of the world coordinate system 109. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

Aside from having three or more high speed motion-tracking cameras (e.g., 121, 122 and 123) pointed at the pre-registered pitcher's mound 107, one or more field-effect gathering cameras such as 124 may be provided to face and report on spectator behavior and/or general lighting and weather conditions. More specifically, one group of spectators may be seated in a spectators' area 106 behind home plate 105. One relatively low speed video camera 124 may be provided facing that spectators' area 106 to capture images telling of the moods of the spectators in that area 106. For example, the spectators (106) may be cheering or jeering the pitcher 110 depending on which team they favor. The at least three, motion tracking cameras, 121, 122 and 123 are positioned in a roughly semi-circular pattern about the tracked player (e.g., 110) and are configured to capture high frame rate images of the pitcher 110 and the pitched ball 111. In one embodiment, a first of the high speed cameras 121 is located in or near the third base dugout. A second high speed cameras 122 is located in or near the first base dugout. A third high speed camera 123 (a.k.a. Camera 1C) is located behind home plate in the corresponding, behind home, spectators' area 106 and at a substantially greater height than the heights of cameras 121 (a.k.a. Camera 1A) and 122 (a.k.a. Camera 1B). Field-effect capturing camera 124 may be pointed at the area of the third high speed camera 123 for creating a low speed record of the environment surrounding that third high speed camera 123. Each of cameras 121, 122 and 123 has a respective but different point of view (POV) and each has a respective XYZ local reference frame (121$xyz$, 122$xyz$, 123$xyz$) that depends on how the corresponding image detection plates (121YZ, 122YZ, 123YZ) of the respective high speed cameras 121-123 are positioned. In one embodiment, each of the high speed cameras 121-123 operates at 240 Frames per second (240 F/s) or faster and has a 1280 by 780 image capture plate (121YZ, 122YZ, 123YZ). It is to be appreciated that the respective high speed cameras 121-123 need not be identical to one another because ultimately, respective pixels (or other such picture element areas) of their respective image capture plate (121YZ, 122YZ, 123YZ) are individually mapped to a shared multi-dimensional frame of reference (e.g., frame 109 having Cartesian axes Xw, Yw and Zw as well as world time clock Tw) in a manner that unifies a corresponding multi-dimensional actor model (150) so that the model substantially complies with various laws of physics (e.g., $F=m*a$) and optionally laws of biomechanics. By contrast, the slower-speed spectators watching camera 124 operates at, for example a more conventional 30 Frames per second. The substantially greater frame rates of the high speed cameras 121-123 are picked so as to obtain a larger number of captured position states of the pitcher 110 and of the pitched ball 111 as the pitcher 110 goes through his pitching motions at high speed. The frame rates of the high speed cameras 121-123 do not all have to be the same. However, it is preferred that they be the same so that one backup camera (not shown) can substitute in for any of cameras 121-123 that happens to fail during an in-the-field event. In an alternate embodiment, the high speed cameras are provided as paired and close to one another identicals (at least two of each kind) so that if one fails, its twin can be substituted in for it. The desirable speed for the high speed tracking cameras (e.g., 121-123) may vary from application to application depending on the duration of a play action event that is to be captured by way of at least N sample states distributed over time, where N is a relatively large number (e.g., 50 or more) that provides a sufficient number of samples for enabling the rendering of an interpolation-wise fitted mathematical curve describing a correspondingly sampled motion as a smooth physics-based curve that extends continuously both in three-dimensional space and in time with minimizable error relative to what actually transpired in-the-field. Here, the spatial coordinates of the smooth physics-based curve may coincide with the "world" coordinates frame 109 and the temporal coordinate of the smooth physics-based curve may coincide with the "world" time clock Tw. For each point on the smooth physics-based curve (e.g., 162$f$ of FIG. 1, 262$f$ of FIG. 2) there is a corresponding, single time point value (e.g., in terms of Tw) and a single set of three-dimensional coordinates (e.g., in terms of Xw, Yw and Zw).

While one application contemplates just three high speed tracking cameras (e.g., 121-123) per focused-upon player, additional motion tracking cameras and field-effect capturing cameras can be used to increase the accuracy of high speed tracking and of the slower speed recording of field conditions during the sporting event. While in one embodiment, all the cameras are configured to sense visible light (e.g., 390-700 nm in wavelength), it is within the contemplation of the present disclosure to use cameras that alternatively or additionally sense electromagnetic radiation outside the range of visible light, such as infrared radiation (IR), depending on the application, where the imagery in the outside-of-visible ranges may be used to facilitate automated recognition of skeletal features and/or to pinpoint thermal hot spots on the pitcher's body and/or pinpoint the location of distinguishing clothing fibers included in the players uniform and having distinguishing spectral characteristics and/or light polarizing characteristics.

High speed image capture cameras (e.g., ones that operate at 240 Frames per second (240 F/s) or faster) are used for cameras 121-123 because more image samples per second results in more sample states for reconstructing a physics-based model (and preferably also a biomechanically compliant model) of what is seen in the camera captured frames. For instance, capturing images of a flying bullet at different points along its path would typically require a faster image capture rate than capturing images of a car driving slowly (e.g., less than 50 MPH) on a highway. So for the case of a pitched ball that travels at close to 100 MPH and for the case of the pitcher whose throwing hand releases the ball at that speed, 240 F/s or faster is preferred. Moreover, a sufficient number of observations from different points of view (POV's) is desired so that modeling is based on independent witnessing of a common event (e.g., the pitching of the baseball) from different viewpoints (e.g., POV-a, POV-b, POV-c) whereby, even if one line of sight is obstructed by intervening objects, another line of sight to the same sample point of interest (e.g., the pitcher's right elbow) is not obstructed and thus provides independent object tracking information. The path 103 of the tracked high speed object (e.g., baseball) can be described in terms of the world 3D coordinate system 109, also known as a free space coordinate system and in terms of real world time, where the world 3D coordinate system 109 is fixed (by user choice) relative to the earth or other environment of interest. In one approach, the world coordinate system 109 includes orthogonal directions represented by an Xw axis, a Yw axis, and a Zw axis. An origin of the world coordinate system may be chosen to be, for example an edge point or center point of home plate 105, but other locations may be used. The start of the "world" time clock Tw may be made to coincide with a game timing clock kept by game officials.

Each camera can be provided with sensors which detect intrinsic and extrinsic parameters of the camera where these parameters can be variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912,700, issued Jun. 15, 1999, incorporated herein by reference. The sensors can be used to determine the field of view of the camera, e.g., where the camera is pointing and what it can see. The intrinsic and extrinsic parameters of each camera are provided to the model constructing subsystem (not explicitly shown) so that such can be used for transforming between the 2D image capture worlds of each camera and the ultimately developed multi-dimensional (4D) actor model 150. The provided parameters may include data indicating whether the frames of the camera are interlaced or not and indicating the relative temporal sequencings of the scan lines in the camera's video feed.

It is alternatively possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing reference marks in various measured or known locations in the event facility such that each mark looks different and at least one mark will always be visible to the camera while the camera is pointed at the event facility. More specifically, these reference marks may be positioned at convenient spots about the pitcher's mound 107 as indicated in FIG. 1. A computer using optical recognition technology can find the pre-specified marks or spots in video frames and then, based on the mark's size and position in the video frame, determine the camera parameters. Another approach to determining intrinsic and extrinsic parameters of a camera involves placing reference marks in various measured or known locations in the event facility such that each mark looks different, but the marks may be removed after camera parameters have been determined. A computer implementing a camera parameter estimation algorithm based on manual user interaction rather than, or in addition to, image recognition can determine camera parameters. Moreover, temporal synchronization among the plural high speed tracking cameras (e.g., 121-123) may be provided prior to game time by filming a dropping of a ball (e.g., baseball) from a predetermined height directly above one of the on-the-ground registration points 107 while the dropping ball (or other reference object) is in line of sight of all the high speed tracking cameras (preferably while wind is not blowing). Since the dropped object is subject to a known common acceleration (e.g., gravity), its speed and distance from point of drop may be readily deduced and used for determining how its moving image travels across the respective image capture plates (121YZ, 122YZ, 123YZ) of the respective cameras. Thus a combination of shared temporal and spatial positionings for a commonly viewed reference object. The ball drop may be repeated over each of the plural registration points 107. In one embodiment, an electronically triggered ball suspending and dropping apparatus may be used. Alternatively, a human may drop the ball.

During the game, the plural high speed tracking cameras (e.g., 121-123) capture respective 2D images of the pitcher 110 and the thrown ball 111 in the monitored area 107 (preregistered area) and communicate the images in the form of analog or digital signals to a processing facility (not explicitly shown) which can be a mobile facility such as a van or trailer (see briefly 580 of FIG. 5) parked outside the event facility 101, in one possible approach. The processing facility includes equipment such as analog or digital image storage units 131, 132 and 133 (respectively for high speed cameras 121, 122 and 123) which receive and temporarily store full lengths of the latest captured motion imagery. However, the full lengths of captured motion imagery including that before and after the pitch are not kept. Instead a pitch detecting mechanism such as a peak ball speed radar gun 120 is used to determine the approximate time at which the ball 111 is in a play action state, in other words it is being thrown. A time stamp signal TRIG corresponding to a time point on a common clock is passed to each of the image storage units 131, 132 and 133 to indicate to each, how much (what segment length) of a full length of captured motion footage should be kept for each respective pitch. For example, it may be decided to keep 5 seconds worth of captured frames before the ball 111 is first detected by radar gun 120 and 2 seconds worth after. Thus for each pitch event, only the relevant clip of motions (e.g., 7 seconds total) is kept for further use and analysis (including rendering of the current 3D biomechanical motion model) and the rest is discarded. This helps to reduce the amount of data storage needed. As indicated under skeletal model 150, and by the exemplary frame label 169, each kept frame of each camera may be assigned a Game number (and optionally a Season number not shown), a within-game Event number (e.g., pitch number), a respective Camera number and a respective Frame number of that camera. In one embodiment, a per frame time synch code 169a is additional recorded in the frame label 169. The per frame time synch code 169a is provided from a shared code-outputting synch box (not shown) that outputs a common per frame time synch code signal (and optionally a common per scan line time synch code signal to each of the cameras) and the cameras annotate their respective video output signals with corresponding metadata. Alternatively, the time synch code signals of the shared and code-outputting synch box (not shown) are supplied to corresponding event storage units (e.g., 131-133) of the respective cameras and the time synch code signals are merged with the video signal feeds at the event storage units (e.g., 131-133) instead.

In one embodiment, the kept data is instead initially identified by a unique play action event ID number (e.g., pitch ID number) and a type of player indicator (e.g., pitcher or batter) where the unique play action event ID number may for example be a hash of the play action event date, time and arena identification. A substantially same play action event ID number may be provided for each paired set of pitcher and batter play actions so that the performances of both can be correlated to one another, although such pairing is not necessary. Once the play action event date, time and arena ID are extracted, these can be mapped to specific seasons, game numbers and pitching event numbers where the latter then map by way of a team's kept records into identifying the specific pitchers and batters (and optionally other in-the-field sports participants) involved with the event. Data is captured and used by each team for its own purposes. Thus, once a team knows the Game number, they know from their records which opposing team they played and the identities of all the players who played and when (e.g., in which innings). Once a team knows the within-game Event number (e.g., pitch number), they know from their records who the pitcher was, who the batter was, who the catcher was (who the umpire was) and details about each of the specific participants involved in the identified event. Finally from the Camera number and Frame numbers, they can deduce the Point of View (POV) of the respective frames and the associated camera intrinsic and extrinsic parameters. The captured, kept and identified frames are processed to determine the most likely 3D positions and/or paths over time of each tracked target (e.g., the pitcher 110 and the thrown ball 111). More specifically, it is known from basic rules of physics that no object (of everyday size) can be at two different locations at the same time, or have two different speeds or two different trajectories of motion. A set of indicated motion and timing parameters can be developed for each tracking camera and then those originating from different cameras can be merged using a least squares or other error reduction technique for determining the most likely 3D position, speed and trajectory at each point in time for each identifiable and modeled object (e.g., the thrown ball 111, the pitchers right elbow 153, left elbow 156, right knee 163, left knee 168, and so on). The accuracy and resolution of the images merger and common motion equation derivation operation should be sufficiently high to provided descriptive equations of motion and determine their characteristic parameters, for example, for tracking the thrown baseball 111 to an accuracy of milliseconds or less as needed. In most cases, an accuracy in the 4D model space (e.g., X, Y, Z, Tw—but could be polar or other coordinates) is not needed down to the single microsecond scale (1 μs) or the single micrometer scale (1 μm).

When the captured images are provided in video signals from the cameras 121-123 and relevant parts are kept based on the shared TRIG signal and/or embedded time synch code signals, the processing facility can then enhance the kept video signals; e.g., by digitizing them if not already done, improving contrast so that pre-specified body parts (e.g., elbows, knees) of the tracked player can be better identified by automated recognition means so that event representing skeletal or like models 150 can be produced based on the determined positions and paths of the specifically tracked objects. Statistical information regarding each tracked object can be also be produced for storage in a database (DB 170). This allows for later data mining based on for example, average and/or peak and/or minimum speeds, average directions and/or angles (e.g., angle made at right elbow between forearm and biceps portion), distance traveled by each tracked object, height of each tracked object, time of the ball flight in the air and so forth. The processing facility can subsequently transmit the captured, kept and enhanced images and information regarding the TRIG specified play action event via a radio antenna (not shown, see FIG. 5 instead) for further storage and further processing at another location such as a television broadcast facility or a sports data processing center.

In terms of detail, for each high speed camera, 121, 122 and 123 and for the respective 3D orientation 121xyz, 122xyz, 123xyz of its respective image capture plane, 121YZ, 122YZ, 123YZ, respective transformation matrices may be developed for converting from the 2D coordinates of the respective image capture plane, 121YZ, 122YZ or 123YZ to the 3D spatial coordinates of the "world" reference frame 109. (While not shown, a similar transformation can be derived for converting chronologically from the respectively timed, scan lines—which could be interlaced or not—of each camera to the real world time frame, Tw; where due to the image capture time lag from one scan line to the next, the corresponding pixels do not have identical points of existence along the real world time line, Tw.) A spatial transformation matrix M, may be defined based on the localized field spot registration process (e.g., pitcher's mound area 107) and in accordance with the following equation EQU. 01:

$$M = \begin{pmatrix} m00 & m01 & m02 & m03 \\ m10 & m11 & m12 & m13 \\ m20 & m21 & m22 & 1 \end{pmatrix} \qquad \text{(Equ. 01)}$$

M relates the respective camera image coordinate system to the world coordinate system. Equations of motion may be used to express the three-dimensional location of each tracked object as a function of time. The equations of motion should be sufficiently accurate over the course of the measured trajectory. Approximate equations of motion and piecewise equations of motion that apply to portions of the trajectory are acceptable to provide the estimated position of the object for any given relevant time is within required measurement accuracy. Further, the equations used should be suitable for the type of object tracked and the desired degree of tracking accuracy. For example, the equations of motion for a ball 111 or other object under the constant of gravitational and/or other acceleration in the three-dimensional world coordinate system may be as follows:

$$X_w(t) = x_0 + v_{x0}*t + (\tfrac{1}{2})a_x*t^2 \qquad \text{(Equ. 02)}$$

$$Y_w(t) = y_0 + v_{y0}*t + (\tfrac{1}{2})a_y*t^2 \qquad \text{(Equ. 03)}$$

$$Z_w(t) = z_0 + v_{z0}*t + (\tfrac{1}{2})a_z*t^2 \qquad \text{(Equ. 04)}$$

The nine parameters x0, y0, z0, vx0, vy0, vz0, ax, ay and az, are coefficients of the equations of motion for respective vector directions. Coefficients x0, y0, z0 denote the initial position, coefficients vx0, vy0, vz0 denote the initial velocity of the object in the three orthogonal directions at time t=0, and coefficients ax, ay, az denote the vector components of acceleration operating on the object in the three orthogonal directions at time t. The acceleration can indicate, e.g., how much force is on the ball, denoting how much it is curving. The xyz acceleration components can be converted to corresponding xyz force components (F=ma) once the involved masses are determined. For example, one biomechanical model proposed in FIG. 2 takes into account both skeletal dimensions (e.g., bone lengths) and the muscle masses carried above and/or below each joint. The mass and acceleration data may be used to deduce how much force is exerted by each muscle group to defy gravity and to impart an observed acceleration on one or more body parts and/or the sports object (e.g., the pitched baseball 111). For convenience, g denotes gravitational acceleration at −9.8 m/sec.sup.2. While the above equations of motion are linear, one or more non-linear equations can be used as well. For example, a velocity squared term may be used when it is desired to account for atmospheric drag on an object in flight.

For each respective image capture plane, 121YZ, 122YZ or 123YZ, an initial approximation of a location of a tracked object (e.g., 111) in the image may be identified by the pixel coordinates (sy, sz), where sy denotes a horizontal position in the image and sz denotes a vertical position in the image. The object can be detected in the image in different ways. In one approach, the pixel or subpixel data of the image is processed to detect areas of contrast which correspond to the object and its shape (e.g., round). For example, a white baseball may contrast against the green grass of the playing field. The expected size of the object in pixels can be used to avoid false detections. For example, a contrasting area in the image which is significantly smaller or larger than the expected size of the object can be ruled out as representing the object. Moreover, once the position of the object in a given image is identified, its position in subsequent images can be predicted based on the position in the previous image. Other various techniques for analyzing images to detect pre-specified objects which will be apparent to those skilled in the art may be used. For example, various pattern recognition techniques can be used. Radar, infra-red and other technologies can also be used as discussed in U.S. Pat. No. 5,912,700, issued Jun. 15, 1999, and U.S. Pat. No. 6,133, 946, issued Oct. 17, 2000, both of which are incorporated herein by reference. In one embodiment, where initial camera settings do not provide sufficient contrast between one or more focused-upon players and their respective backgrounds, optical spectral filters and/or polarizing filters may be added to the cameras to improve contrast between player and background. More specifically, in one example player uniforms may be specially coated with light polarizing fibers and/or infra-red (IR) absorbing fibers that substantially distinguish the players from natural field materials so that corresponding camera equipment can capture well contrasted images of the players as distinct from background filed imagery.

With respect to recognition of locations of various body parts of the in-the-field sports participant (e.g., the left and right elbows of the pitcher 110), again various pattern recognition techniques can be used, including use of IR band detection for detecting heat signatures of known hot spots of the human body (when exercising), use of predetermined markers on the player's uniform (e.g., including light polarizing markers), head gear and/or foot gear, use of smart or dumb bracelets worn by the player (where a smart bracelet may produce its own location, velocity, acceleration and local temperature data) and use of ruler based biometrics of the identified player. By 'ruler based biometrics' it is meant here that once the identity of the player is established (e.g., by game number and event number), data from a database containing ruler-type measurements of distances between landmark body parts can be fetched; for example, the distance from his left elbow to his left shoulder (see briefly FIG. 2) and such 'ruler based biometrics' can be used to rule out pattern recognition guesses that violate laws of physics. More specifically, if an automated pattern recognition guess proposes that the left elbow is located at a position farther from the left shoulder than the predetermined distance from his left elbow to his left shoulder (see briefly FIG. 2) then clearly that guess is in error and needs to be ruled out. 'Ruler based biometrics' is just one of many forms of biometric data discussed herein. General biometrics may encompass many forms of real time or pre-event or post-event measurements relating to the player's biological makeup including, but not limited to, skin temperature, perspiration levels, heart rate (e.g., as determined by EKG), blood pressure, metabolite levels, muscle contraction or tensioning (e.g., as determined by EMG), cranial electrical activities (e.g., as determined by EEG), etc., where the measurements of the respective biometric parameters can be said to be potentially influential on the performance of the player during a respective play action.

Still referring to the conversion of camera plane data to world frame data, the inverse task is to calculate the screen coordinates, (sy, sz), given the world coordinates (world space) of a point. In practice, the point in world space might correspond to a physical object like a ball (111) or a part of a geometrical concept, like a lay line, but in general can be any arbitrary point or interrelated set of points. One example method is to break the overall mapping into three separate mappings. First a mapping is carried out from three dimensional (3D) points expressed in world coordinates (world space) to 3 D points expressed in camera centered coordinates. This first mapping may be denoted as $T_{WTC}$. Second, a mapping is carried out from 3D points expressed in camera centered coordinates, to undistorted two dimensional (2D) screen coordinates (e.g., a position in the video). This mapping models the effects of cameras; i.e. producing 2D images from 3D world scenes. This second mapping may be denoted as K. Third, there is a mapping from undistorted screen coordinates to distorted screen coordinates (e.g., a position in the video). This mapping models various effects that occur in cameras using lenses; i.e. non-pinhole camera effects. This third mapping is denoted here as f.

When composited together, the three mappings create a mapping from world coordinates into screen coordinates:

When composited together, the three mappings create a mapping from world coordinates into screen coordinates (in the below equations, screen coordinates are given as Sx and Sy):

$$\begin{pmatrix} X_w \\ Y_w \\ Z_w \end{pmatrix} \xRightarrow{T_{WTC}} \begin{pmatrix} X_c \\ Y_c \\ Z_c \end{pmatrix} \xRightarrow{K} \begin{pmatrix} S_x \\ S_y \end{pmatrix} \xRightarrow{f} \begin{pmatrix} s'_x \\ s'_y \end{pmatrix} \quad (1)$$

Each of the three mapping noted above will now be described in more detail.

The mapping from 3D world spatial coordinates to 3D camera centered coordinates ($T_{WTC}$) will be implemented using 4×4 homogeneous matrices and 4×1 homogeneous vectors. The simplest way to convert a 3D world point into a 3D homogeneous vector is to add a 1 into the 4th element of the 4×1 homogeneous vector:

$$\underbrace{\begin{pmatrix} X_w \\ Y_w \\ Z_w \end{pmatrix}}_{inhomogenous} \rightarrow \underbrace{\begin{pmatrix} X_w \\ Y_w \\ Z_w \\ 1 \end{pmatrix}}_{homogenous} = X_W \quad (2)$$

The way to convert from a 3D homogeneous vector back to a 3D inhomogeneous vector is to divide the first 3 elements of the homogenous vector by the 4th element. Note that this implies there are infinitely many ways to represent the same inhomogeneous 3D point with a 3D homogeneous vector since multiplication of the homogeneous vector by a constant does not change the inhomogeneous 3D point due to the division required by the conversion. Formally we can write the correspondence between one inhomogeneous vector to infinitely many homogeneous vectors as:

$$\underbrace{\begin{pmatrix} X_w \\ Y_w \\ Z_w \end{pmatrix}}_{inhomogenous} \rightarrow k \underbrace{\begin{pmatrix} X_w \\ Y_w \\ Z_w \\ 1 \end{pmatrix}}_{homogenous} \quad (3)$$

for any k≠0

In general the mapping $T_{WTC}$ can be expressed with a 4×4 matrix:

$$T_{WTC} = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} \quad (4)$$

which can be expressed using row vectors as:

$$T_{WTC} = \begin{bmatrix} t^{1T} \\ t^{2T} \\ t^{3T} \\ t^{4T} \end{bmatrix} \quad (5)$$

Finally if we use homogeneous vectors for both the world point m world coordinates, $X_w$, and the same point expressed in camera centered coordinates, $X_c$ the mapping between the two is given by matrix multiplication using $T_{WTC}$:

$$X_c = T_{WTC} X_w \quad (6)$$

If we want the actual inhomogeneous coordinates of the point in the camera centered coordinate system we just divide by the 4th element of $X_c$. For example if we want the camera centered x-component of a world point we can write:

$$X_c = \frac{t^{1T} X_W}{t^{4T} X_W} \quad (7)$$

To build the matrix $T_{WTC}$, we start in the world coordinate system (word space)—which is a specific UTM zone—and apply appropriate transformations:

For example, to translate to a helicopter mounted camera location (derived from GPS Receiver data): T ($H_x$, $H_y$, $H_z$)

Account for the exemplary helicopter rotation relative to the world coordinate system, based on obtained inertial data:

$R_z$ (−$Pan_{Heli}$)
$R_x$ (−$Tilt_{Heli}$)
$R_y$ ($Roll_{Heli}$)

Account for outer axis (outer axis of camera system) orientation relative to the exemplary helicopter frame (adjustments for misalignment of the outer ring relative to the helicopter body):

$R_z$ (PanAdjust)
$R_x$ (TiltAdjust)
$R_y$ (RollAdjust)

Account for outer axis transducer measurement from the camera system and off set of zero readings relative to outer axis:

$R_z$ ($Pan_{Outer}$+PanAdjust2)
$R_x$ ($Tilt_{Outer}$+TiltAdjust2)

Note that PanAdjust2 and TiltAdjust2 are adjustment values for imperfections in the outer axis orientation. If the output of the sensor should be 0 degrees, these parameters are used to recognize 0 degrees. $Pan_{Outer}$ and $Tilt_{Outer}$ are the sensor (e.g., transducer) readings output from the camera system for the outer axis.

Account for non-linearity of inner axis (of camera system) pan and tilt transducer measurements via a look-up table $Pan_{Inner\_linearized}$=L ($Pan_{Inner}$)
$Tilt_{Inner\_linearized}$=L'($Tilt_{Inner}$)

Account for inner axis transducer measurements and offset of zero readings relative to inner ring:

$R_z$ ($Pan_{Inner\_linearized}$+PanAdjust3)
$R_x$ ($Tilt_{Inner\_linearized}$+TiltAdjust3)
$R_y$ ($Roll_{Inner}$+RollAdjust3)

Note that PanAdjust3, TiltAdjust3 and RollAdjust3 are adjustment values for imperfections in the inner axis orientation. If the output, of the sensor should be 0 degrees, these parameters are used to recognize 0 degrees. $Pan_{Inner}$, $Tilt_{Inner}$ and $Roll_{Inner}$ are the sensor (e.g., transducer) readings output from the camera system for the inner axis.

Finally, convert to standard coordinate convention for camera centered coordinate systems with x-axis pointing to the right of the image, y-axis pointing up in the image, and z-axis pointing behind the camera $$- R_x\left(\frac{\pi}{2}\right)$$

Thus the final rigid-body transform, $T_{WTC}$ which converts points expressed in world coordinates to points expressed in the camera centered coordinate system and suitable for multiplication by a projection transform is given by:

$$T_{WTC} = R_x\left(\frac{\pi}{2}\right) R_y(\text{Roll}_{Inner} + RollAdjust3) \cdot \quad (8)$$

$R_x(\text{Tilt}_{Inner\_linearized} + TiltAdjust3) \cdot$ $R_z(\text{Pan}_{Inner\_linearized} + PanAdjust3) \cdot$ $R_x(\text{Tilt}_{Outer} + TiltAdjust2) R_z(\text{Pan}_{Outer} + PanAdjust2) \cdot$ $R_y(RollAdjust) R_x(TiltAdjust) R_z(PanAdjust) \cdot$ $R_y(\text{Roll}_{Heli}) R_x(-\text{Tilt}_{Heli}) R_z(-\text{Pan}_{Heli}) T(H_x, H_y, H_z)$ The form of the three rotation matrices: $R_x$, $R_y$, $R_z$ suitable for use with 4×1 homogeneous vectors are given below. Here the rotation angle specifies the rotation between the two coordinate systems basis vectors.

$$R_x(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (9)$$

$$R_y(\alpha) = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{bmatrix} \quad (10)$$

$$R_z(\alpha) = \begin{bmatrix} \cos\alpha & \sin\alpha & 0 & 0 \\ -\sin\alpha & \cos\alpha & 0 & 0 \\ 0 & 0 & 1 & 0 \\ 0 & 0 & 0 & 1 \end{bmatrix} \quad (11)$$

The matrix representation of the translation transform that operates on 4×1 homogeneous vectors is given by:

$$T(d_x, d_y, d_z) = \begin{bmatrix} 1 & 0 & 0 & d_x \\ 0 & 1 & 0 & d_y \\ 0 & 0 & 1 & d_z \\ 0 & 0 & 0 & 1 \end{bmatrix} \quad (12)$$

The mapping of camera centered coordinates to undistorted screen coordinates (K) can also be expressed as a 4×4 matrix which operates on homogenous vectors in the camera centered coordinate system. In this form the mapping from homogeneous camera centered points, $X_c$, to homogeneous screen points, $S_u$ is expressed:

$$S_u = KX_c \quad (13)$$

$$w \begin{pmatrix} s_x \\ s_y \\ s_z \\ 1 \end{pmatrix} = KX_c \quad (14)$$

To get the actual undistorted screen coordinates from the 4×1 homogenous screen vector we divide the first three elements of Su by the 4th element.

Note further that we can express the mapping from homogeneous world points to homogeneous undistorted screen points via matrix multiplication.

$$S_u = KT_{WTC}X_w$$

$$= PX_w$$

where, $$P = KT_{WTC} \quad (15)$$

One embodiment uses a pinhole camera model for the projection transform K. If it is chosen to orient the camera centered coordinate system so that the x-axis is parallel to the $s_x$ screen coordinate axis, and the camera y-axis is parallel to the $s_y$ screen coordinate axis—which itself goes from the bottom of an image to the top of an image—then K can be expressed as:

$$K = \begin{bmatrix} -\dfrac{f'}{\text{par}} & 0 & u_0 & 0 \\ 0 & -f' & v_o & 0 \\ 0 & 0 & A & B \\ 0 & 0 & 1 & 0 \end{bmatrix} \quad (16)$$

where, $$f' = \frac{N_y/2}{\tan(\varphi/2)} \quad (17)$$

$N_y$ = number of pixels in vertical screen direction
$\varphi$ = vertical field of view
par = pixel aspect ratio
$u_o, v_o$ = optical center
A, B = Clipping plane parameters.

The clipping plane parameters, A, B, do not affect the projected screen location, $s_x$, $s_y$, of a 3D point. They are used for the details of rendering graphics and are typically set ahead of time. The number of vertical pixels, $N_y$, and the pixel aspect ratio par are predetermined by video format used by the camera. The optical center, ($u_o$, $v_o$) is determined as part of a calibration process. The remaining parameter, the vertical field of view $\varphi$, is the parameter that varies dynamically.

The screen width, height and pixel aspect ratio are known constants for a particular video format: for example $N_x$=1920, $N_y$=1080 and par=1 for 1080i. The values of $u_o$, $v_o$ are determined as part of a calibration process. That leaves only the field of view, $\varphi$, which needs to be specified before K is known.

The field of view is determined on a frame by frame basis using the following steps:

use the measured value of the 2× Extender to determine the 2× Extender state;

use the 2× Extender state to select a field of view mapping curve;

Use the measured value of field of view, or equivalently zoom, and the particular field of view mapping curve determined by the 2× Extender state to compute a value for the nominal field of view;

use the known 2× Extender state, and the computed value of the nominal field of view in combination with the measured focus value, to compute a focus expansion factor; and compute the actual field of view by multiplying the nominal field of view by the focus expansion factor.

One field of view mapping curve is required per possible 2× Extender state. The field of view mapping curves are determined ahead of time and are part of a calibration process.

One mapping between measured zoom, focus and 2× Extender and the focus expansion factor is required per possible 2× Extender state. The focus expansion factor mappings are determined ahead of time and are part of a calibration process.

The mapping (f) between undistorted screen coordinates to distorted screen coordinates (pixels) is not (in one embodiment) represented as a matrix. In one example, the model used accounts for radial distortion. The steps to compute the distorted screen coordinates from undistorted screen coordinates are:
   start with the inhomogenous screen pixels $S_u=(s_x, s_y)^T$
   compute the undistorted radial distance vector from a center of distortion, $s_o\delta r=s_u-s_o$.
   compute a scale factor $\alpha=1+k_1\|\delta r\|+k_2\|\delta r\|^2$
   compute the inhomogeneous screen pixel vector $S_d=\alpha\delta r+S_o$ Some embodiments will also normalize the data.

The two constants $k_1$, $k_2$ are termed the distortion coefficients of the radial distortion model. An offline calibration process is used to measure the distortion coefficients, $k_1$, $k_2$, for a particular type of lens at various 2× Extender states and zoom levels. Then at run time the measured values of zoom and 2× Extender are used to determine the values of $k_1$ and $k_2$ to use in the distortion process. If the calibration process is not possible to complete, the default values of $k_1=k_2=0$ are used and correspond to a camera with no distortion. In this case the distorted screen coordinates are the same as the undistorted screen coordinates.

The above discussion provides one set of examples for tracking objects and enhancing video from a mobile camera based on that tracking. The technology for accommodating mobile cameras can also be used in conjunction with other systems for tracking and enhancing video, such as the systems described in U.S. Pat. Nos. 5,912,700; 5,862,517; 5,917,553; 6,744,403; and 6,657,584. All five of these listed patents are incorporated herein by reference in their entirety.

The given technology for converting from 3D coordinates to the 2D coordinates of the camera plane (e.g., 121YZ, 122YZ, 13YZ of FIG. 1) can be used in the inverse form to determine the likely coordinates in the 3D world frame 109 based on pixel coordinates of the given camera once the camera's frame of reference has been determined as relative to the world frame 109.

Still referring to FIG. 1, the determined 3D coordinates of automatically recognized within-the-video objects (e.g., location of the ball 111, location of the player's right elbow, left elbow and so forth) are fed to an automated 3D skeleton generator 140. In the case of the three high speed cameras, 121-123, the kept video portions from all three of them are fed to the 3D skeleton generator 140. If there were more high speed cameras, their respective outputs (whether in the raw or preferably already converted into 3D world coordinates within the respective event store blocks; e.g., 131-133) are also fed to the 3D skeleton generator 140.

Here, the 3D skeleton generator 140 will be receiving different witness accounts (so to speak) from the differently positioned witnesses (a.k.a. cameras 121-123) as to where specific ones of tracked objects were allegedly located at respectively alleged times. (The timings are alleged rather than precise because the cameras 121-123 are operating as free-running (not all genlocked) and thus at least semi-asynchronously relative to one another and the image frame of one camera; e.g., 121 generally does not match in either timings of its respective pixels or point of view (POV) with that of another of the cameras; e.g., 122 or 123. The job of the 3D skeleton generator 140 is to develop from the discrete allegations (a.k.a. snapshot like scanned reports or scan-wise captured frames) from plural witnessing devices (not limited to just the cameras 121-123, could also include smart bracelets worn by the player) a coherent and physics-wise smoothed story of where each tracked object (the ball 111, the player's right elbow 153, left elbow 156, right knee 163, left knee 168, etc.) was at each instant of the so-called, real world time line Tw. This can be done with the physics-based motion equations given above. The witness-alleged trajectories of each followed object are melded together into a single mathematical function describing the more likely behavior of the real world object in terms of world coordinates (109). Where witness accounts differ or one witness did not see (for example because one of the pitcher's hands was obscured by an intervening object), the accounts of the more likely to be reliable witnesses (e.g., the camera with the best view) is given weighted preference.

More specifically and considering ankle joint 162 as an example of a tracked object, kept footages from each of the high speed cameras 121-123 that can see the real player's (110's) ankle area will be processed using an automated ankle joint recognition and locating machine process. For example, the location of the ankle joint may be guessed at using markers on the pitcher's exposed sock and/or using a known spatial relationship between the back bottom of the pitcher's shoe and where his ankle should be. The ankle joint recognition and locating machine process applied to the respectively kept footage of the each of the high speed cameras 121-123 for a given pitching event will produce discrete sample points 162s (each depicted as a square in FIG. 1) distributed time wise and three-dimensional space-wise about what will ultimately become the finalized 3D trajectory 162f assigned to the tracked ankle joint 162 where that finalized 3D trajectory 162f is a continuous and smooth mathematical expression depicting the 3D position of the ankle joint 162 over a continuous interval of time (t). Least square curve fitting and/or other best fit curve determining techniques may be used to arrive at the ultimately produced continuous and smooth 3D trajectory 162f.

During this process, as the final time line for each developed mathematical motion description (e.g., 162f) is worked out, the identities of the time-wise closest witness accounts (162s) are recorded in a database as correlating to a time interval that applies along the developed final time line and trajectory 162f. For example, for the time range of 1.500 seconds to 1.501 into the finalized time line of Event 3 of Game 2, and for the pitchers back ankle, the correlated sample frames 162s may be, in the case of camera 121 its Frames 200 and 201, for camera 121 its frame number 256 (recall that the cameras are not precisely synchronized) and for camera 123 its frame numbers 221, 222 and 223 (these numbers being hypothetical). Afterwards, when an analyst receives and reviews the in motion, skeletal model 150 and respective smooth trajectories (e.g., 162f) for each followed body part, where the analyst nonetheless wants to review the original camera footages (e.g., of cameras 121-123), the analyst can specify a portion of the finalized time line (e.g., of trajectory 162f) and the system will automatically return to the analyst the corresponding frame numbers of the respective high speed cameras that were used to arrive at that model trajectory (e.g., 162f). Thus the analyst can refer back to the original data (e.g., 162s) to determine if the automated 3D skeleton generator 140 produced a believable 3D skeletal model 150 and/or the analyst can refer back to the original kept footage to determine what extrinsic effects may have been in play at the moment. Was the wind blowing at a certain speed and direction so as to throw the pitcher off his usual game? Was the background crowd jeering the pitcher? Was it drizzling? The skeletal model alone (150) may not always tell the full story.

Signal coupling line 171 of FIG. 1 represents the storing into an appropriate database (e.g., DB 170) of the developed body part trajectories (e.g., 162f) of each of pre-specified body parts. In one embodiment, for each pitcher these may include: (1) the pitcher's head e.g., 155; (2) his throwing shoulder (which would be the left one if a left-handed pitcher); (3) his throwing elbow e.g., 153; (4) his non-throwing shoulder; (5) his non-throwing elbow e.g., 156; (6) his throwing hand (the one pitching the ball) e.g., 151; (7) his non-throwing hand (the one that is gloved) e.g., 157; (8) a marker e.g., 154 on his torso which could a marker on the upper part of his uniform or his belt buckle or a marker on the backside of his belt; (9) the knee e.g., 163 of his trailing leg; (10) the knee e.g., 168 of his forward leg; (11) the ankle e.g., 162 of his trailing leg; (12) the ankle e.g., 166 of his forward leg; (13) the toe e.g., 161 of his trailing leg; and (14) the toe e.g., 167 of his forward leg. The trajectory of the pitched ball itself 152 may be followed while it is in camera view. Additional parts of the pitcher's body that are tracked may include his left and right pelvic joints 164. Yet other objects may be included, for example but not limited to, parts of his uniform and/or worn smart or dumb bracelets, his cap, specific parts of his glove and so forth. Various items worn by the in-the-field and tracked sports participant may function as biometric telemetry devices configured for measuring respective biometric parameters and wirelessly relaying the same to a biometric data receiver that then relays its collected data to the database (e.g., via connection 173). The relayed biometric parameters may include time stamped measurements of player heart rate, breathing rate, temperature, blood pressure, galvanic skin response (indicating degree of sweating), muscle tension, and so forth.

In addition to the stored 3D model trajectories 171, the may be stored in the database 170 a list of calculated inflection points for each trajectory (e.g., 162*f*) and/or for derivatives thereof (e.g., dz/dt for 3D curve 162*f*), for example one indicating when and where the pitcher's throwing hand 151 was at its highest and another indicating when and where the pitcher's throwing hand 151 was moving at its fastest (max dx/dt) relative to a picked line of direction. In this way the database 170 can later be automatically mined by queries searching for this kind of specific information. As mentioned, digitized versions 175 of the kept video footages are stored and logically linked to the respective trajectories (e.g., 162*f*). Data 172 regarding various field effects such as sounds, wind gusts, drizzles, bright sun and so forth are further recorded in the DB 170 as being logically linked to the stored trajectories (e.g., 162*f*) of the respective play action event (e.g., pitching event number 3 of game 2). The recorded field effects data is not limited to physical effects and may alternatively or additionally include mental effects that may sway a pitcher or batter, such what the current score is at the time of the play action event, whether the bases are loaded, whether there is a full count; whether the batter/hitter is left-handed rather than right handed; whether an on-base runner is threatening to steal; and so forth. Various event statistics 174 associated with the respective play action event are also stored and logically linked to the stored trajectories, for example, what was the identity of the pitcher 110, of the batter, of the catcher, of the home plate umpire, of the third base coach? What was the maximum speed of the pitched ball as measured by the in-the-field radar device 120? What was the outcome of the pitch, e.g., a strike, a ball, a hit, a grand slam? Moreover, the ruler-based biometrics and other biometrics 173 of the player are logically linked to the stored trajectories (e.g., 162*f*) for sake of being able to later determine if there is a correlation for the tracked player as between, for example, respiration rate (breathing) and pitch outcome.

While FIG. 1 depicts a baseball pitcher 110 who normally (routinely) hovers about a pre-registered pitcher's mound 107, the techniques described herein can be similarly applied to other in-the-field sports participants who normally or at specific times hover about register-able field locales such as, but not limited to, a baseball batter at home plate, a baseball catcher behind home plate, an on-deck next batter who is practicing his swing in the on-deck circle, a soccer goal keeper in his goal area, a hockey goal keeper, a basketball player while shooting a foul shot at a registered foul line area or from a favorite 3-point shooting spot, a tennis player while at a ball serving area, a golfer while at a tee-off position and so forth. In one embodiment, and for the case of the baseball batter at home plate, the tracked body parts may include: (1) the batter's head; (2) the top end of his held bat; (3) the bottom (hand held) end of his bat; (4) his forward shoulder (which would be the left one if a right-handed batter); (5) his back shoulder; (6) hip of his forward leg (which would be the left one if a right-handed batter); (7) hip of his back leg; (8) the knee of his forward leg; (9) the knee his trailing leg; (10) the ankle of his trailing leg; (11) the ankle of his forward leg; (12) the toe of his trailing leg; and (13) the toe of his forward leg. The trajectory of the pitched ball itself (111) may be followed while it is in camera view. If both the baseball pitcher and batter are being tracked with high speed cameras (e.g., 121-123) then each such in-the-field and tracked sports participant is assigned a respective set of cameras dedicated to focusing on the normal hovering locale of that player. For example, there would be a total of at least six high speed cameras operating if both the baseball pitcher and batter are being tracked. In one embodiment, the first base dugout is equipped with two such cameras, one pointing at the pitcher, the other at the batter. Similarly the third base dugout is equipped with two such cameras respectively pointing at the pitcher and the batter. And a high spot behind home plate is additionally equipped with two such cameras respectively pointing at the pitcher and the batter. Of course these are merely exemplary positionings of the plural, high speed cameras (e.g., 121-123) and in other embodiments the respective cameras may be positioned higher above the ground level of the playing field so as to gain a downward looking perspective. As the case with the pitcher, additional parts of the batter's may be tracked as deemed appropriate by the analysts who plan to study that player's in-the-field biomechanics. Tracking markers (e.g., visual and/or electronic transponders) may be positioned about the batter's body; for example, on different parts of his uniform (including on or in the shoes) and/or on worn smart or dumb bracelets, his batting helmet, in his batting gloves and so forth. Biometric telemetry devices may be embedded in various items worn by the batter.

Figure 2:
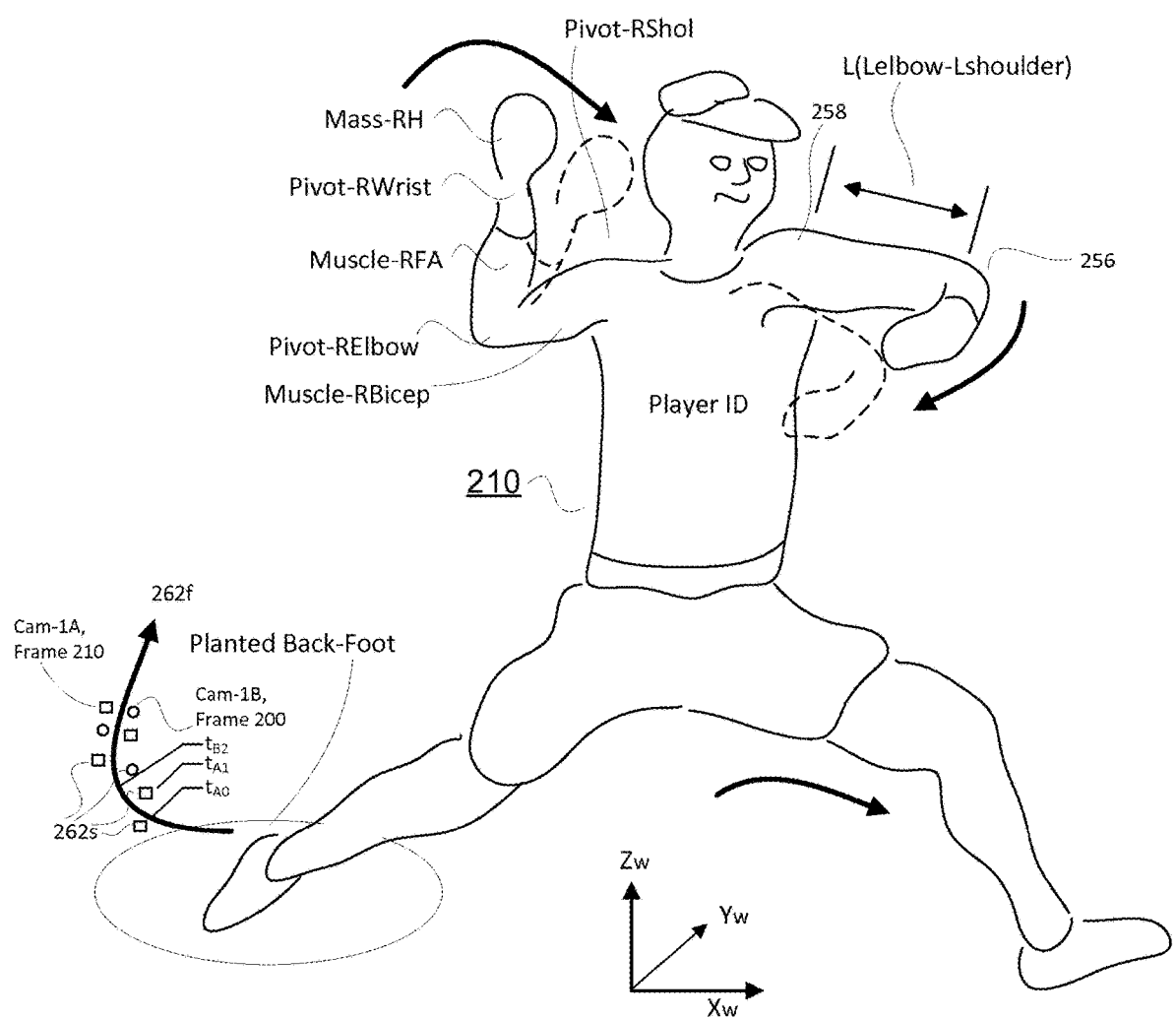
FIG. 2 depicts a generated biomechanics-based model for a baseball pitcher which takes into account muscle masses, bone lengths and joint positionings.

Referring to the perspective view of FIG. 2, the 3D moving models 210 of the respective in-the-field sports participants need not be merely, skeleton alone models such as shown at 150 of FIG. 1. Instead additional body parts may be included for better modeling of the actual player. More specifically, while the ruler-based biometrics of each identified player's skeletal parts are retained (e.g., length of bone L( ) between left shoulder 258 and left elbow 256), the model 210 is augmented with data indicating the muscle mass present about each jointed bone so that observed acceleration ($a_{xyz}$) of the part may be combined with the measured mass (m) about the part to determine the respective forces ($F_{xyz}=m*a_{xyz}$) being exerted by the in-the-field sports participant during a play action event. Various pre-game techniques (e.g., ultrasonic tissue density imaging) may be used just prior to each game for measuring, for example, the latest mass of the baseball pitcher's right hand above his wrist joints (Mass-RH), the amount muscle in his right forearm (Mass-RFA), the amount muscle in his right bicep area (Mass-RBicep) and so forth. These are stored as part of the in-the-game biometrics of the respective player 210. One utility of the force versus mass versus acceleration plots obtainable from the generated moving 3D model is to understand the interplay between weight training in the gymnasium for example and the positive or negative effects that may have on the baseball pitcher's ability to throw a faster pitch. On the one hand, extra muscle mass say in the right forearm (Mass-RFA) may work to reduce acceleration (because a=F/m). On the other hand, having additional muscle mass of the right kind (smooth versus striated) in the right bicep area (Mass-RBicep) may help increase the force applied to the right elbow (Relbow) and thus increase the throwing velocity (where $v_{xyz}$ is the integral over time of the 3D acceleration vectors, $a_{xyz}$). Data collected from actual in-the-field sports events may help shed light on what combinations of reduced and increased muscle masses for each specific player and in each specific body part may have a positive or negative influence on in-the-field performance. The player's training coaches may use this information to better advise the player on how to train his muscles in between games.

FIG. 2 also depicts a modeled object path 262f as seen within the world reference frame (Xw, Yw, Zw). The modeled object path 262f may be used to determine for example, what heights and/or rotations the tracked body part (e.g., the right ankle) attains during the play action event (e.g., the pitching of the baseball). More specifically, the object path 262f may be expressed using a world coordinate system which in this example is a Cartesian coordinate system having an origin at home plate (105 in FIG. 1) and an Xw axis extending from home plate to the pitcher's preregistered mound 107. Displacement along the Xw axis and over a respective time interval $(t_2-t_1)$ therefore represents an average velocity employed by the displaced object (e.g., a pitcher's body part, for example his right hand) and useful for accelerating the ball (111) toward home plate. The Zw axis represents a height of the object relative to the top surface plane of home plate and therefore may indicate, e.g., the height of the baseball, above the ground as it speeds toward the strike zone. The Yw axis represents a lateral displacement position of the object away from the Xw axis (the straight line path toward home plate). Displacement along the Yw and Zw axes and over a respective time interval $(t_2-t_1)$ may therefore represent curvature effects imparted to the pitched ball as it speeds toward the strike zone above home plate. Other coordinate systems can also be used such as polar, spherical or other non-orthogonal coordinate systems. As mentioned, the high speed motion capture cameras (e.g., 121-123) are free running and use their internal frame-rate clocks for determining respective image capture rates. Thus, the cameras asynchronously (or semi-asynchronously in the case of time sync code annotated frames) capture respective and discrete snapshot images of the tracked object as it moves in time along its smooth motion path 262f, where the respective camera frames (and/or their included image scan lines) cover different points in time during a time interval in which the tacked object is moving. For example camera 1A (aimed at the pitcher) may capture some of the discrete snapshot images (depicted in FIG. 2 as 262s) at respective time points such as, $t_{A0}$, $t_{A1}$, $t_{A2}$, . . . , $t_{A11}$, which may be mapped to positional points along smooth motion path 262f (where "$t_{A0}$, . . . , $t_{A11}$" are not all shown) while camera 1B (also aimed at the pitcher) may capture some of the discrete snapshot images (depicted in FIG. 2 as 262s) at respective time points such as, $t_{B0}$, $t_{B1}$, $t_{B2}$, . . . , $t_{B10}$ which may be separately mapped to positional points along smooth motion path 262f (where "$t_{B0}$, . . . , $t_{B10}$" are not all shown). Note that it is not necessary for each camera to capture its images at a fixed rate, or for the different cameras to capture images at the same rate and at exactly same time points. The example shown is meant to depict that a physics-based, smooth motion 3D curve 262f is fitted with curve fit optimization techniques relative to the witnessing accounts given by the respective high speed cameras (121-123) where the witnessing accounts given by a subset of the cameras may be given greater weight than those of one or more of the other cameras due to closeness and/or better point of view (POV).

Once a plurality of games and play action events for respective players (e.g., baseball pitchers and batters) are stored in the database 170, various database queries may be submitted and results analyzed to determine for example: whether consistency in landing position of the pitcher's plant foot impact his performance; which pitcher arm slots and initial shoulder positions lead to sharper movement on pitches; whether a given pitcher's elbow drops as he tires during the course of a game; whether certain trends in a given pitcher's repetitive motions are likely to lead to serious long term injuries; whether certain initial stances for a given pitcher's delivery start correlate to better or worse performance than other initial stances; whether certain foot plant positions and orientations for a given pitcher's delivery correlate to better or worse performance than other foot plants; whether certain maximum heights of back leg lift correlate to better or worse performance; whether certain points of hand/ball separation correlate to better or worse performance; whether certain extents of maximum backswing correlate to better or worse performance; and whether certain follow throughs (e.g., back foot touch down positions and orientations) correlate to better or worse performance than other follow throughs. Similarly for baseball batters, various database queries may be submitted and results analyzed to determine for example: whether certain batter stances at the start of the pitcher's delivery correlate to better or worse performance by the batter; whether certain bat motion paths correlate to better or worse performance; whether certain bat to ball contact zones correlate to better or worse performance; whether certain batting follow through motions correlate to better or worse performance; how long on average does it take for the batter to start his swing; how often does the batter hit the sweet spot of his bat; what factors correlate to the batter starting his swing too early or too late; if the batter misses the pitched ball, how much does he miss by; and how often is the batter fooled into swinging at bad balls.

Figure 3:
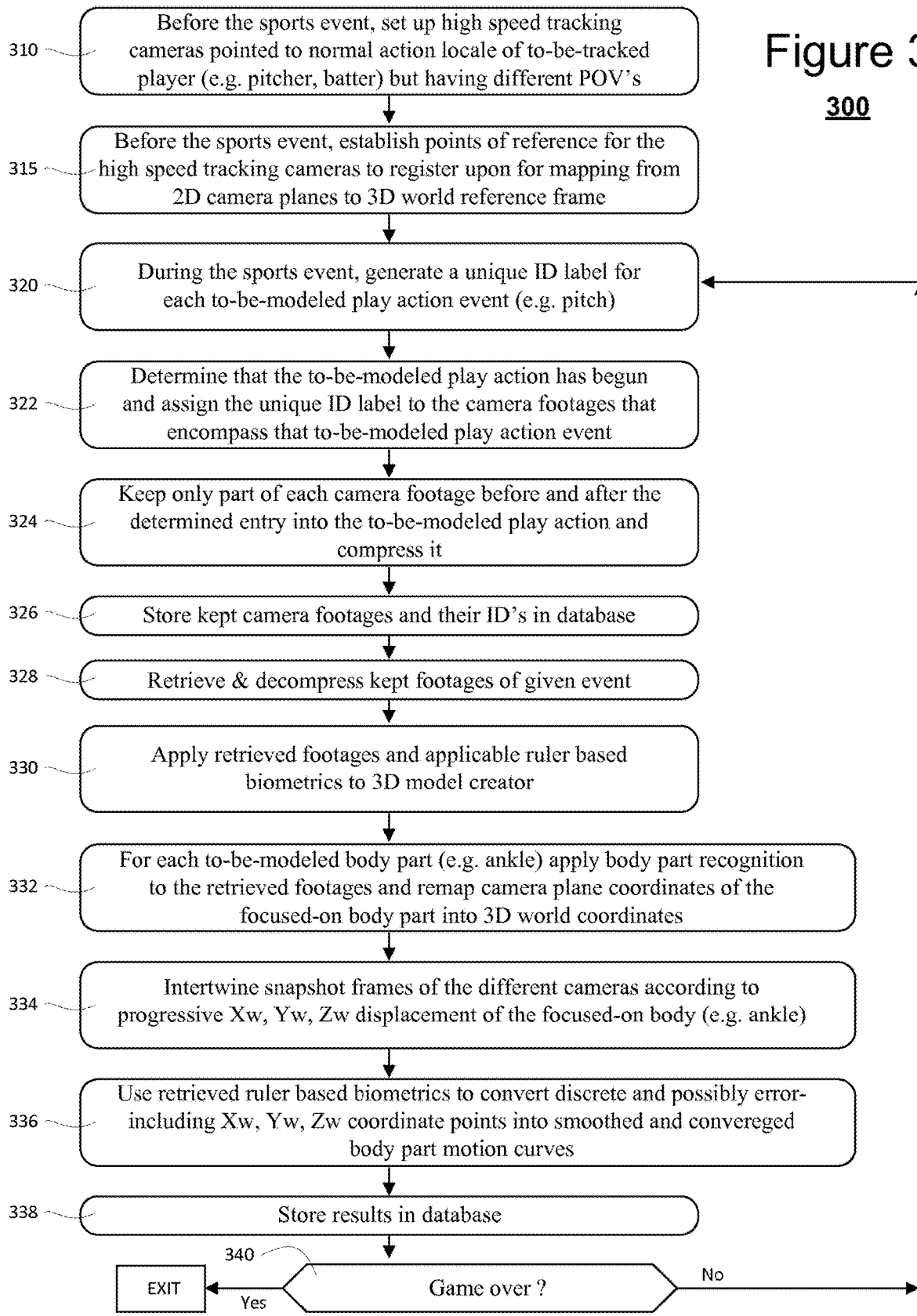
FIG. 3 depicts a flow chart of a process for capturing event imagery and converting it into a biomechanics-based model.

FIG. 3 depicts a flow chart of a process 300 for generating a 3D moving player model such as 150 of FIG. 1 or 210 of FIG. 2.

Step 310 includes the pre-game setting up of the high speed tracking cameras (e.g., 121-123) at respective locations that give them different points of view (POV's) toward their intended player hovering area (e.g., the pitcher's mound) in a manner that reduces likelihood that, at any time, all cameras will be obstructed from seeing any of the predetermined and to be tracked body parts of the in-the-field sports participant (e.g., the pitcher's arms, legs and head). Step 315 includes the pre-game establishing of registered points of reference about the intended player hovering area (e.g., the pitcher's mound); for example by planting predetermined fiducial objects about that area, such that a relatively accurate mapping is enabled between the 2D image capture plane of each camera when the camera is in one or more pre-registered orientations and a predetermined 3D "world" reference frame (e.g., 109 of FIG. 1).

Step 320 includes a generating of a unique ID label for labeling a soon to be recorded, kept and respective segment of footage for each high speed tracking camera (e.g., 121-123), where for example the unique ID may be a hash of the current date, current time and current location (e.g., arena ID) such that the kept and respective segments of footage for the to be tracked play action event (e.g., the pitch) of the respective and (semi-) asynchronously operating cameras may be logically linked to one another at least by way of the unique ID label. At a later time the unique ID label can be mapped into corresponding data identifying the team's season number, game number, pitching event number, pitcher ID, batter ID and so forth. At each of the high speed tracking cameras (e.g., 121-123), the unique ID label is combined with corresponding camera ID and camera orientation data where the combined data is to be logically linked to the soon to be recorded, kept and respective segment of footage.

At step 322 it is automatically determined that the expected play action event (e.g., next pitch) has begun (has been entered into). Any one or more of different ways to detect entry into the play action event can be used. FIG. 1 shows one example where an in-the-field radar gun 120 detects a pitched ball speeding towards home plate and outputs a responsive TRIG signal 120b. Other methods for detecting entry into a play action event can alternatively or additionally include using a video camera trained on an area of interest and/or any other optical sensors for detecting change of scenery or occurrence of pre-specified movement within the scenery; having a human being hit an event-started button or the like; using sensor beams such as IR beams and/or electromagnetic fields and/or acoustic fields of appropriate frequencies (e.g., ultrasonic motion detection) to detect pre-specified movement and/or crossings of pre-specified boundaries, markers within a predetermined scenery area; using LIDAR; using accelerometers and/or other location and/or velocity/acceleration detecting means for detecting pre-specified movements and/or crossings of pre-specified boundaries, markers within a predetermined scenery area; and so on. The respective event storage units (131-133) of each of the respective high speed tracking cameras (e.g., 121-123) have already been recording received camera imagery, but not with the plan of storing all of it on a long term basis. This is merely buffered storage. When the TRIG signal 120b is received, it signals to each event storage unit to discard the portion of the buffered imagery that was received more than a first predetermined duration before the receipt of the TRIG signal 120b and to continue recording and keeping a remainder of the footage segment that ends at a second predetermined duration after the receipt of the TRIG signal 120b. After they are recorded, the combined first and second durations of the kept footage may be compressed (in step 324), for example with use of MPEG4 technology. The combined first and second durations are moreover logically linked to the generated combination of unique event ID label and corresponding camera ID and camera orientation data so that it (the kept footage) can be later individually recalled by using the unique event ID label.

The same radar gun generated TRIG signal 120b can be used for determining the durations of to be kept footage segments for tracking a batter at home plate 105 except that the start and stop time points of the batter footage segments can be slightly different and also the high speed tracking cameras used for the batter will be three or more others (not shown) rather than cameras 121-123, where those other three or more high speed tracking cameras (not shown) will be trained on and pre-registered to fiducials place about home plate rather than about the pitcher's mound 107. It is within the contemplation of the present disclosure to alternatively or additionally use other automated devices besides the pitched ball radar gun for automatically determining that a play action event (e.g., a ball pitch) has been entered into or has just completed and that a corresponding TRIG signal is to be output. For example, each baseball pitcher may be required to wear an acceleration sensing band on his throwing arm which wirelessly reports arm acceleration to a wireless receiver and the latter outputs the TRIG signal when acceleration exceeds a predetermined threshold. Alternatively or additionally, one of normal speed video cameras at the arena (e.g., camera 124) may be trained on the pitcher 110 and may be operatively coupled to pitch recognition software where the latter outputs the TRIG signal when the pitch recognition software recognizes that a pitch event has commenced. Alternatively or additionally, the catcher's mitten may be outfitted with a wireless ball impact detector and the latter automatically reports that a pitch event has just ended when detected impact exceeds a predetermined threshold. Accordingly the generation of the TRIG signal 120b need not be dependent on the presence of a working pitch speed determining radar gun 120 and various alternative devices may be used where, in one embodiment, each alternative device provides a TRIG signaler identification with its output TRIG signal 120b and the player tracking system 100 uses different to-be-kept footage begin and end specifiers depending on the received identification of the TRIG signaler.

At step 326 the compressed and to be kept footage segments (175 in FIG. 1) of each of the high speed tracking cameras (e.g., 121-123) are transferred from the respective buffering event storage units (131-133) together with their ID data to the database. Associated field effects data 172 and non-ruler biometrics (e.g., player heart rate) 173 are also at this time stored in the database 170 and logically linked to the unique event ID label. The event statistics data 174, 3D skeletal moving models 171 and ruler-based biometrics (e.g., player weight, dimensions) may be added to the database 170 at a later time and also logically linked to the unique event ID label.

FIG. 1 depicts the kept event footages of all the high speed tracking cameras (e.g., 121-123) being fed in real time into the 3D skeletal model(s) generator 140. This is depicted as such for more simply conveying the concept. As a practical matter, the 3D skeletal model(s) 150/210 are preferably generated at a later time; perhaps during play action breaks (e.g., TV commercial breaks) or perhaps at a different location and overnight. The more accurate and more sophisticated 3D skeletal model(s) 150/210 may take a substantial amount of time to generate, whereas it may be possible to generate low resolution crude models at the location of the game and before the game ends for use by game announcers.

At step 328 the compressed and kept footage segments (175 in FIG. 1) of an identified play action event (e.g., the pitch) involving an identified player are retrieved and decompressed.

Next, at step 330 the retrieved footages are applied together with retrieved ruler based biometrics of the identified player to a 3D moving model creator (e.g., 140 of FIG. 1). Here, body part recognition is initiated separately for each to be focused-upon body part (e.g., the pitcher's trailing ankle). The in-camera-plane coordinates of the focused-upon body part are automatically determined. Then (step 332) for the corresponding frames of each of the high speed tracking cameras (e.g., 121-123), the in-camera-plane coordinates of the focused-upon body part are automatically converted to 3D world coordinates (using the transformation techniques discussed above).

At step 324 the frames (e.g., 262s of FIG. 2) of the different high speed tracking cameras (e.g., 121-123) are intertwined with one another in accordance with progressive, nearest neighbor ones of the mapped 3D world coordinates of the focused-upon body part (e.g., the pitcher's trailing ankle). However, in the case where the frame-to-frame temporal spacings of successive frames of a same camera are known to a high degree of precision, the known frame-to-frame temporal spacings are not modified. Instead the only temporal spacings between the frame sets of different cameras is made a variable. The intertwining according to nearest neighbor, initial 3D world coordinates is so done because physical inertia dictates that the position of the focused-upon body part cannot change in a non-smooth discontinuous manner for a nonzero mass that is being propelled by a finite force. So nearest neighbor ones of the mapped 3D world coordinate points should appear as progressive in time, one after the next. The specific smooth motion curve (e.g., 262f of FIG. 2, 162f of FIG. 1) of the focused-upon body part (e.g., ankle) has not yet been finalized at this stage and instead is an initial estimations of what will shake out to be the finalized smooth motion curve. In other words, a first estimated at best fit, curve fitting algorithm is employed to crudely dispose a first round, smooth motion curve (e.g., 262f of FIG. 2) adjacent to the intertwined in time and space 3D world coordinate points for the moving body part (e.g., ankle). A more accurate smooth motion curve is developed when adherence to both frame to frame spacings for plural body parts and adherence to biometric ruler rules are applied after, for example, the first round motion curve for the knee is also generated, where under the biometric ruler rules, the first body part (e.g., ankle) must always be a fixed 3D distance away from the second body part (e.g., knee) because the size of the linking bone does not change. As biometric ruler rules and physical inertia rules are automatically repeatedly applied to interlinked parts of the initial skeletal model, the respective body part motion curves (e.g., 262f of FIG. 2) shake out to converge into their finalized forms and the timings of respective spatial points along the developed body part motion curves (e.g., $t_{A1}$, $t_{B2}$) are resolved. At the same time the nearest neighbor camera frames for corresponding ones of the respective spatial points along the developed body part motion curves are also determined. As already explained above, in the case of the embodiment of FIG. 2 and of the applied physical inertia rules, the measured masses of the respective body parts are included in the process of converging the respective body part motion curves into their finalized forms (step 336). The finalized body part motion curves are stored as expressed mathematical relationships in the database (step 338).

At step 340 it is automatically determined if the game is over. For example, this may be automatically tested for by pinging the game radar gun 120 and if it does not respond for more than a predetermined duration, it is concluded that it has been turned off and the game is over. Alternatively or additionally, other automated devices that are normally turned on during the game and turned off at the end of the game may be queried. Alternatively or additionally, a local technician may manually indicate to the executing process 300 that the game is over and then the process stops. On the other hand, if the game is not over, control is passed to step 320 where the ID label for the next expected pitch event is obtained for use with steps 322-338.

Figure 4:
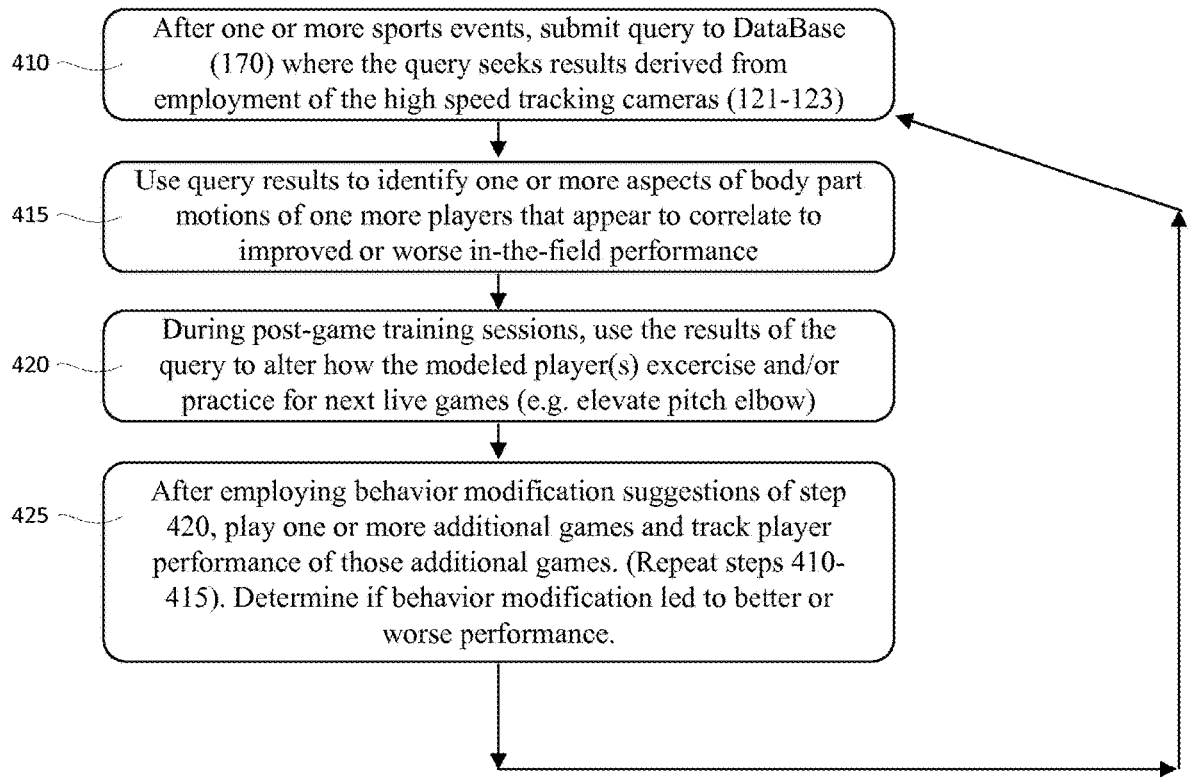
FIG. 4 depicts a flow chart of a process for using a plurality of models created by the process of FIG. 3.

Referring to FIG. 4, a machine-implemented process 400 for using the data stored in the database 170 is disclosed. At step 410, a manually or automatically generated, database query (e.g., in SQL format) is submitted to the database 170 after the results of one or more games have been stored in the database and where the query seeks results (e.g., answers, search hits) that depend at least in part on the deployment of the high speed player tracking cameras (e.g., 121-123) that were used in the corresponding one or more games. The query may be directed to a single identified player (e.g., one specific baseball pitcher or batter) or it may be directed to a specified set of same type players (e.g., all left handed pitchers on my team). Examples of the kinds of queries that might be submitted have been implied at in the above. For example, one such query may seek results for the question: For just the right-handed pitchers on my team and for Games 1-5 of Season 3, how often did right elbow speed in the Xw direction exceed 50 MPH (miles per hour)? When the results come back, the query submitter may ask the database: Show me the corresponding high speed tracking camera kept-footage for Game 2 of Season 3 where right-handed pitcher X had a right elbow speed of 55 MPH or higher. Since the database 170 stores mathematical expressions of the motion curves (e.g., 262f) of the respective different and focused-upon body parts (e.g., right elbow, left elbow, trailing ankle, etc.), those stored mathematical expressions can be quickly mathematically processed to obtain answers related for example to velocity and acceleration by automatically obtaining first and second order derivatives relative to time (e.g., dx/dt, dy/dt, dz/dt) for respective parts of the kept 3D motion description curves. Alternatively or additionally, some mathematical processing results (e.g., Max(dx/dt), Min(dx/dt)) may be pre-calculated and already stored in the database so that more frequently submitted queries (FAQ's) can be answered more quickly. It is within the contemplation of the present disclosure to alternatively or additionally store the skeletal model motions (e.g., 262f) and/or velocities, accelerations and/or other performance-related attributes derived therefrom as graphed curves and/or in the form of sample points stored in respective tables. Since the database 170 also stores logical linkages between the kept high speed footages and corresponding points on each motion curve (e.g., 262f), once one or more points on a motion curve are identified as satisfying the database query, the corresponding one or more footages from the respective cameras can be automatically fetched for review and analysis. One of the optional analysis possibilities is to build a new skeleto-muscular model of the player from the same footage but while using a different model building process and comparing the new skeleto-muscular model against the one previously used to see which one gives more accurate results for specific kinds of queries.

Referring to step 415 of FIG. 4, the utilized queries of step 410 can be repeatedly used ones (pre-canned queries) or newly created ones where the goal is to identify one or more aspects of one or more tracked body part motions where the identified aspects appear to correlate to either improved in-the-field performance (e.g., more strike outs for the pitcher, more hits for the batter) or worse in-the-field performance (e.g., more balls for the pitcher, more strike outs for the batter). The identified aspects may vary and may include, but are not limited to: (1) a determined maximum or minimum height of a player's first and/or second elbow (and/or of other tracked body part(s)) that correlates with better or worse outcomes (the outcomes being stored in the database as event statistics 174 of FIG. 1 and being logically linked to respective play action events); (2) a determined maximum or minimum velocity in a specific direction (e.g., Xw, Yw, Zw) of an identified body part that correlates with better or worse outcomes; (3) a determined maximum or minimum acceleration in a specific direction of an identified body part that correlates with better or worse outcomes; (4) a determined average of one or more of body part height, velocity and velocity that correlates with better or worse outcomes; (5) a determined statistical variance over a series of play actions in one or more of body part height, velocity and velocity that correlates with better or worse outcomes; and (6) a determined combination of maximums, minimums, averages, statistical variances and statistical distribution skews that appear to correlates with better or worse outcomes. Step 415 may be comprised of a collection of trial and error repeats of step 410 and automatically repeated testing for which query results best correlate with the a specific kind of good or bad game outcome that is being queried for.

Referring to step 420 of FIG. 4, once specific correlations have been identified in step 415, the team players and/or coaches are advised of the results and they use the results to modify how one or more of the players practices in between games and/or exercises in the gymnasium and/or eats or takes medications and/or relates to psychological therapy sessions so as to try to find a new paradigm that leads to improved performance. More specifically, and merely as an example, it may be discovered that an increase in muscle mass in a pitcher's throwing forearm (e.g., Muscle RFA of FIG. 2) has led to worsened performance because that added mass is reducing the forward acceleration ($a_x=F_x/m$) that the pitcher is imparting to the pitched ball. That pitcher's exercise regimen may then be modified to reduce muscle mass in the forearm while increasing it in the biceps area. What is good for one player may not however, be good for another. For example, one specific pitcher may heavily rely on muscles in his forearm to throw good curve balls. For that second player, reducing forearm muscle mass may lead to worse performance rather than better performance. Accordingly, in-the-field sports performance models are preferably built on an individualized, player by player basis because every player is different and the behavior modification suggestions produced by step 420 will tend to be different for each unique player.

Referring to step 425, after the behavior modification suggestions are deployed in step 420, verification of the expected results is test for in step 425. This involves playing the respective player or players whose training regimens have been changed in additional in-the-field live sports events and recording their, hopefully improved, performances using the process 300 of FIG. 3. Then the modeled results before and after the deployed behavior modifications are compared to see if there was improvement. If not, an analysis is undertaken to find better queries for step 410 that will lead to improvement of positive aspects of each player's performance and/or will lead to reduction of negative aspects of each player's performance.

Figure 5:
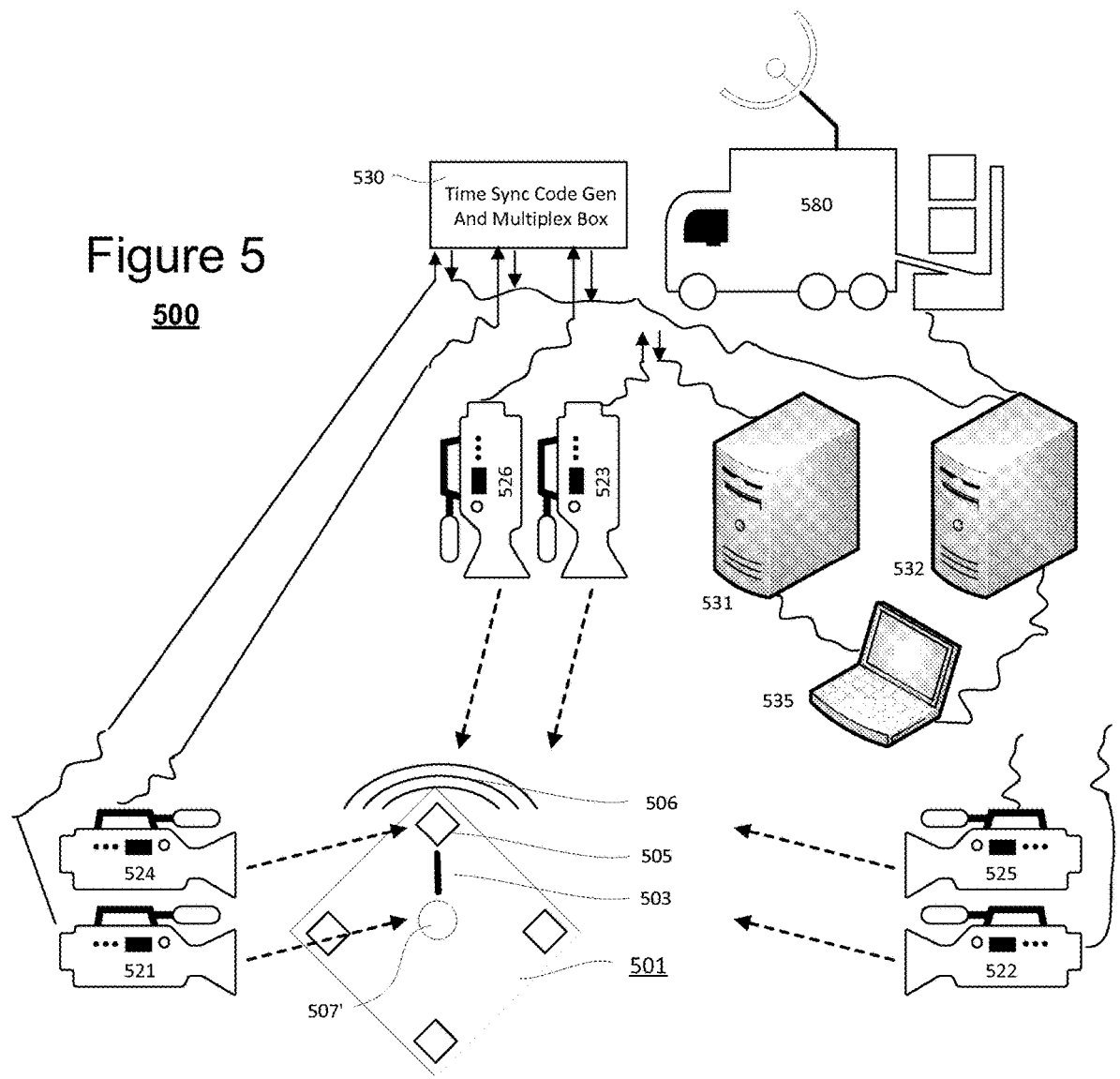
FIG. 5 depicts a hardware configuration that may be used for baseball games.

Referring to FIG. 5, shown is one system set up 500 employing 6 high speed tracking cameras (e.g., 521-523, 524-526) and two event storage servers, 531 and 532 as well as a local monitoring laptop 535 connected to the servers. The first server computer 531 receives respective footage feeds from the high speed tracking cameras 521-523 that are pointed to the pitcher's mound 507'. The second server computer 532 receives respective footage feeds from the high speed tracking cameras 524-526 that are pointed to home plate 505. In one embodiment, each of the 6 high speed tracking cameras, 521-523, 524-526 operates at 240 Frames per second (240 F/s) and has a 1280 by 780 image capture plate. So the raw footage receipt rate of each server is 3×(240×1280×780) or about 720 Megabytes per second (or about 5.8 Gigabits per second). In one embodiment, the cameras run freely and are connected by way of CAT 6 cables to a so-called, time-code synch and multiplexor box 530 which adds time synch codes to the generated video signals where after the time-coded video is multiplexed and transmitted to the servers by way of further CAT 6 cables. The pitch-just-started and/or the pitch-just-ended signal(s) is/are fed to the event storage servers, 531-532 from an appropriate detector device such as the game's ball-speed measuring radar gun (not shown). In response each server determines the start and end points of the recently received footage that is to be kept. The kept footage is compressed (e.g., into MPEG4 format) and logically linked with the assigned play action ID label. The compressed and labeled footages are then relayed via a local TV news truck 580 (e.g., via a microwave antenna mounted on the truck) to an external facility for further processing (e.g., decompression and skeletal model creation). The laptop is used by a local technician (not shown) to verify that the servers appear to be capturing the correct footage segments and that the contrast appears to be sufficient for bodypart recognition. More specifically, the local technician can call for replay on his screen, the more recently kept footage streams of the pitcher's play action and the batter's play action. If for some reason the servers are not cropping the footage at the appropriate start and end points, the technician can make manual adjustments to the software that determines where the start and end points of the kept segments of footage are to be positioned. Additionally, if the locally inspected footage appears to have foreground versus background contrast problems such that the body parts recognition software at the external facility may not be able to distinguish between player outline and the background scenery at that specific sports venue, the technician may take corrective actions such as trying to use different spectral and/or light polarizing filters in front of the camera lens and/or adjusting other variable parameters of the cameras.

Although not explicitly shown, it is to be understood that the utilized servers (e.g., 531-532) and local control laptop 535 may each be a self-contained data processing machine having an appropriate data storage device operatively coupled within or to it as a magnetic hard disk or portable storage media (e.g., flash memory storage) and having appropriate network interface circuits for communicating with other computer systems, as well as one or more data processor units configured for executing software instructions, and a working memory such as RAM for storing the software instructions for example after they are inloaded or downloaded from a nonvolatile storage device. Additionally, the servers will have appropriate camera interfaces for receiving raw footage from the high speed tracking cameras 521-526. The laptop 535 will have an appropriate user interface and display allowing the local technician to perform his duties. Storage devices mentioned herein may be considered to be processor readable storage devices having processor readable and/or executable codes embodied thereon for programming corresponding data processors and enabling them to perform methods that provide the various functionalities discussed herein. The user interface display of mobile device 535 can provide human-usable information to its human operator (e.g., the technician) based on the data received from the cameras via the server interfaces. The user interface display can use any of known display and surface interface schemes, whether graphical, tabular or the like. In addition to an on-screen display, an output such as a hard copy from printer can be provided to report results. Results can also be reported by storing the solved coefficients of mathematical motion describing expressions in the local storage devices (e.g., within the servers and/or laptop) or other memory, e.g., for later use where the solved and store coefficients may be locally generated and/or remotely generated and then fed back (e.g., via the TV network truck 580) to the local sports facility. For example, the solved coefficients may be used by local sports announcers to discuss recent performance parameters of players that are being tracked in real time.

The high speed tracking cameras (e.g., 521-526) may each include extrinsic parameter sensors and/or intrinsic parameter sensors. Such parameter sensors can identify respective orientations of their cameras, such as a pan and tilt of the camera. The parameter sensors may also identify the camera zoom setting, whether an expander is used and so forth. Note that sensors may not be needed when the parameter of concern is not changing. Each camera communicates its captured image data, whether in analog and/or digital form to the respective server interfaces. Additionally, each camera may communicate data from its extrinsic parameter sensors and/or intrinsic parameter sensors to the servers via the camera interfaces.

Figure 6:
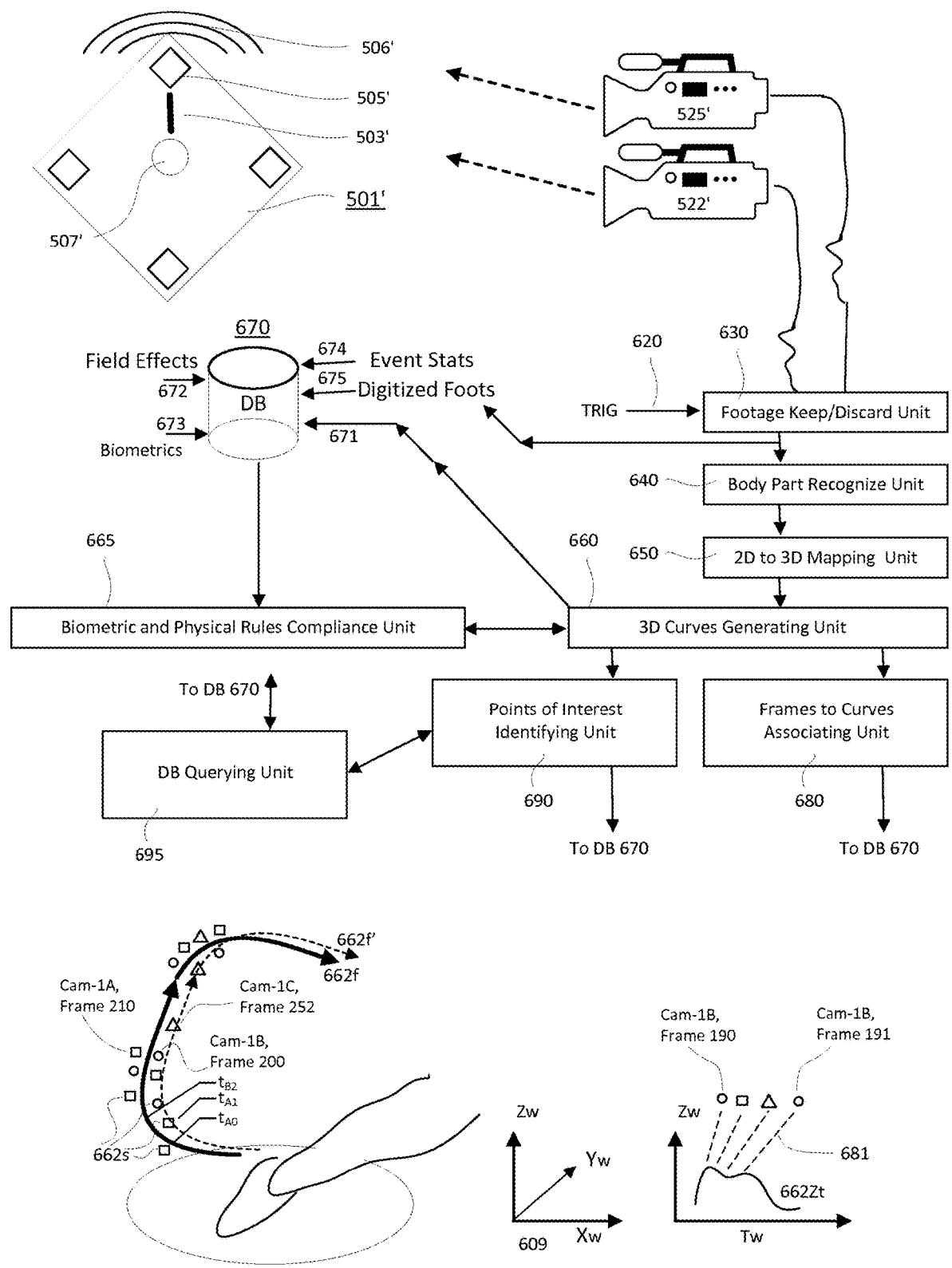
FIG. 6 depicts additional details for a system in accordance with the present disclosure.

Referring to FIG. 6, additional details of one embodiment 600 in accordance with the present disclosure are depicted. A representative two, 522' and 525' of the plural pairs of high speed tracking cameras that are pointed at respective player hovering areas (e.g., 507' and 505') are shown. As mentioned above, it is within the contemplation of the present disclosure to have more than three high speed tracking cameras per player and located in a variety of other positions than the exemplary ones mentioned above (e.g., first and third base dugouts or above those positions). The high speed tracking cameras need not be fixed in position. For example, in an American football game, movable cameras can be suspended on high wires over the field of play and pre-registration for such cameras may have been carried out for the centers of length and left and right ends of major yardage lines (e.g., the 10 yard lines at both ends, the 20 yard lines, the goal lines at both ends and the 50 yard line).

Analog or digital camera feeds are transmitted to one or more respective footage keep/discard decision units such as 630. The respective footage keep/discard decision units (e.g., 630) each receive at least one respective play action trigger signal 620 for the then focused-upon in-the-field sports participant being tracked by the corresponding initial camera footage. The play action trigger signal 620 indicates at least one of when the respective play action was entered into (e.g., begun) by the respective player or when it had just ended. That play action trigger signal 620 and predetermined parameters respecting what portion of the initial camera footage of each camera is to be kept and what discarded, is used to automatically determine what segment(s) of the initial footage are to be kept for use in generating a corresponding motions-tracking model for the focused-upon player. If not yet digitized, the kept segment(s) are digitized and optionally filtered for improved contrast in the respective footage keep/discard decision units such as 630. The digitized, kept footage (675) is stored in database 670 and assigned a play action identification label. The footage (675) stored into the database may additionally be compressed to reduce storage footprint. At the same time or at a later time, the digitized, kept footage (675) is submitted to one or more automated body part recognition units such as 640 where the latter are configured to recognize within the submitted 2D footage, a corresponding one or more body parts of the focused upon player (e.g., pitcher, batter, football place-kicker, etc.).

Next in a 2D to 3D mapping unit 650, the recognized 2D positions of being tracked body parts of the respective focused-upon player are converted into 3D coordinate points based on the pre-registration of the respective high speed tracking cameras to corresponding player hovering areas (e.g., the pitcher's mound 507', home plate 505'). The three-dimensional (3D) coordinates data obtained from the plural frames of the different high speed tracking cameras that have respective different points of view (POV's) on the play action of the focused-upon player are transmitted to a corresponding 3D curves generating unit 660. Here the initial intertwining of 3D coordinates derived from the different cameras takes place as depicted for example by sample points 662s of FIG. 6 (and also by 262s of FIG. 2). An initial or first guess, 3D motion curve 662f is generated so as to be fitted by interpolation on or between the intertwined 3D sample points 662s. A variety of different techniques may be used for generating the initial or first guess, 3D motion curve 662f including, but not limited to, restricting the fitted curve to an N'th order polynomial where world time (Tw) is the variable raised to first, second and/or higher powers. Then, the initial or first guess, 3D motion curve 662f is optionally modified (e.g., its motion describing resolution is enhanced) by subjecting it to physical motion rules and/or biometric relations compliance rules stored in a correction unit such as 665. Unit 665 gets its current biometric relations compliance rules for each respective player from the database 670. More specifically, the focused-upon player may have gained or lost weight and/or muscle mass in different parts of his/her body and these parameters have been updated into the database 670 before correction unit 665 provides the biometric relations compliance rules for use in enhancing the motion-describing resolution of the initial or first guess, 3D motion curve 662f.

Descriptions 671 of one or both of the initial or first guess, 3D motion curve 662f and the enhanced motion-describing curve (denoted as dashed curve 662f) are stored in the database 670. The descriptions may come in various forms, including, but not limited to: a first mathematical expression defining all spatial points versus time of the determined three dimensional (3D) smooth and continuous motion curve; coefficients of the first mathematical expression; one or more graphic curves (e.g., the Tw versus Zw curve $662_{Zt}$) defining all spatial points versus time of the determined three-dimensional (3D) smooth and continuous motion curve; sample points in tabular form identifying spatial points and their respective timings along the determined three-dimensional (3D) smooth and continuous motion curve; a second mathematical expression defining first derivatives (e.g., dXw/dTw, dYw/dTw, dZw/dTw) versus time of spatial points of the determined three-dimensional (3D) smooth and continuous motion curve; a third mathematical expression defining second derivatives versus time (e.g., $d^2Xw/dTw^2$, $d^2Yw/dTw^2$, $d^2Zw/dTw^2$) of spatial points of the determined three-dimensional (3D) smooth and continuous motion curve; sample points in tabular form identifying points of potential interest of the determined three-dimensional (3D) smooth and continuous motion curve, the points of potential interest including at least one of maximums, minimums, means and medians of the spatial points or velocities or accelerations associated therewith.

For one or both of the descriptions 671 of the initial or first guess, 3D motion curve 662*f* and the enhanced motion-describing curve 662*f*, a frames to curves associating unit 680 is used to automatically logically link each frame from the kept footages to a corresponding segment portion of the curve so that, when an analyst wants to review the corresponding one or more footage frames that were used to produce an identified portion of the curve, the frames to curves associations can be used to retrieve the appropriate frames from the database 670. Dashed line 681 represents an example of such a frame to curve portion association. Here frame 191 of high speed tracking camera 1B is logically linked to the indicates portion of the motion curve 662$_{Zt}$. The frames to curves associations are stored in the database 670.

Moreover, for one or both of the descriptions 671 of the initial or first guess, 3D motion curve 662*f* and the enhanced motion-describing curve 662*f*, a points of interest identifying unit 690 is used to automatically identify potential points of possible interest along the generated curves. For example the timings of peaks along a ZtTw versus Zw curve 662$_{Zt}$ that describes the motion of a baseball pitcher's trailing ankle may be of interest. The specific attributes of each motion curve that may be of interest may vary from sport to sport and body part to body part. In one embodiment, the amount of potential energy (mgZ$_w$) versus kinetic energy (0.5*m*(dZw/dTw)^2) stored in a given body part at each instant of world time Tw may be of interest and/or minimums and maximums of such attributes may be of interest and the points of interest identifying unit 690 is configured to and used to automatically identify such points along respective motion curves. The results produced by the points of interest identifying unit 690 are automatically stored in the database 670. Later, an analyst may call up such data or query for it using an appropriate database querying unit (e.g., 695) when searching for possible cross correlations between certain motion attributes of respective player body parts (e.g., ankle, elbow, etc.) versus positive or negative game outcomes 674 that are also stored in the database and logically linked to respective play actions.

It is to be understood that various ones of the functionalities described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Accordingly, a method has been provided of determining three-dimensional (3D) performance attributes of an in-the-field and moving sports participant who, at least at certain times routinely hovers about a predetermined hovering area while participating in a live in-the field sports event, where the moving sports participant has a plurality of identifiable body parts, and where the method comprises: receiving and recording first, second and third two-dimensional (2D) images of the moving sports participant from respective first, second and third high speed cameras, where each of the first through third cameras operates at more than 30 frames per second and where the respective first through third cameras are respectively pointed to have different points of view of the predetermined hovering area; and determining from at least two of the received and recorded first through third two-dimensional images, a three-dimensional (3D) smooth and continuous motion curve of a selected one of the identifiable body parts of the moving sports participant, the three-dimensional motion curve covering a continuous segment of time in which the moving sports participant was performing an in-the-field play action.

Moreover, a machine-implemented system has been provided for determining three dimensional (3D) performance attributes of an in-the-field and moving sports participant who, at least at certain times routinely hovers about a predetermined hovering area while participating in a live in-the-field sports event, where the moving sports participant has a plurality of identifiable body parts, and where the system comprises: first, second and third high speed cameras operating (semi-) asynchronously relative to one another, where each of the first through third cameras operates at more than 30 frames per second and where the respective first through third cameras are respectively pointed to have different points of view of the predetermined hovering area; a footage recording unit configured to receive and record corresponding first, second and third two dimensional (2D) images of the moving sports participant from respective ones of the asynchronously operating first, second and third high speed cameras; and recorded footage discarding unit configured to determine which segment parts of the received and recorded first through third two-dimensional images are to be selectively kept and which to be discarded, where the kept segments are usable for determining a three-dimensional (3D) smooth and continuous motion curve of a selected one of the identifiable body parts of the moving sports participant, the three-dimensional motion curve covering a continuous segment of time in which the moving sports participant was performing an in-the-field play action.

The foregoing detailed description of the present disclosure of invention has been presented for purposes of illustration and description. It is not intended to be exhaustive or to limit the present teachings to the precise forms disclosed. Many modifications and variations are possible in light of the above teachings. The described embodiments were chosen in order to best explain the principles of the disclosure and its practical application, to thereby enable others skilled in the art to best utilize the teachings in various embodiments and with various modifications as are suited to the particular use contemplated. It is intended that the scope of the disclosure include the claims appended hereto.

The invention claimed is:

1. A system for determining multi-dimensional (mD) performance attributes of a sports participant comprising:
   at least three high speed cameras configured for network communication with at least one server computer, at least one local computing device, and at least one processing facility;
   wherein the at least three high speed cameras are operable to capture two-dimensional (2D) images of a sports participant;
   wherein the at least one processing facility is operable to:
      store the 2D images of the sports participant in a database;
      develop a mD motion curve for at least two identifiable body parts of the sports participant;
      identify camera frames and/or scan lines from the at least two of the at least three high speed cameras associated with spatial points on the mD motion curve; and
      display the camera frames and/or the scan lines on the at least one server computer and/or the at least one local computing device.

2. The system of claim 1, wherein the at least one processing facility is operable to develop the mD motion curve using the respective temporal segment lengths of the 2D images of the sports participant.

3. The system of claim 1, wherein the at least one processing facility is operable to intertwine and temporally dispose the 2D images of the sports participant along a common timing reference and discard temporally adjacent 2D images.

4. The system of claim 1, wherein the at least one server computer and/or the at least one local computing device is operable to display camera frames corresponding to an identified spatial point on the mD motion curve.

5. The system of claim 1, wherein the at least three high speed cameras are operable to sense electromagnetic radiation outside of the range of visible light to facilitate automated recognition of skeletal features, thermal hot spots on a body of the sports participant, and/or locations of distinguishing clothing fibers on a uniform of the sports participant.

6. The system of claim 1, wherein the database stores data relating to the sports participant and data including sport event results, surrounding field effects, mental effects, and/or in-the-field biometric attributes.

7. The system of claim 6, wherein the in-the-field biometric attributes include a heart rate, a breathing rate, a perspiration level, a blood pressure, a galvanic skin response, a topical temperature, and/or cranial electrical activity of the sports participant recorded at the same time as a play action activity.

8. The system of claim 1, wherein the at least one processing facility is operable to transform the 2D images of the sports participant into four-dimensional (4D) player-biomechanical models.

9. A system for determining multi-dimensional (mD) performance attributes of a sports participant comprising:
   at least three high speed cameras configured for network communication with at least one server computer, at least one local computing device, and at least one processing facility;
   wherein the at least three high speed cameras are operable to capture two-dimensional (2D) images of a sports participant;
   wherein the at least one processing facility is operable to:
      store the 2D images of the sports participant in a database;
      develop a mD motion curve for the sports participant; and
      construct a four-dimensional (4D) model of the sports participant based on the 2D images of the sports participant.

10. The system of claim 9, wherein the at least three high speed cameras operate semi-asynchronously and/or asynchronously, and wherein inconsistencies between the 2D images of the sports participant are resolved based on biomechanical rules of nature or physical rules of nature.

11. The system of claim 9, wherein the at least one processing facility is operable to intertwine and temporally dispose the 2D images of the sports participant along a common timing reference and discard temporally adjacent 2D images.

12. The system of claim 11, wherein the at least one processing facility is operable to revise the intertwined 2D images such that the intertwined 2D images conform to the mD motion curve developed for the sports participant.

13. The system of claim 9, wherein the at least one processing facility develops the mD motion curve within a mD space having at least a time (Tw) axis and three spatial and orthogonal coordinate axes (Xw, Yw, Zw).

14. The system of claim 9, wherein intrinsic and extrinsic parameters for each of the at least three high speed cameras are provided to the at least one processing facility to construct the 4D model of the sports participant.

15. The system of claim 9, wherein the at least one processing facility stores cross associating points of motion relating to environmental conditions and sport event results with the 4D model of the sports participant in the database.

16. A system for determining multi-dimensional (mD) performance attributes of a sports participant comprising:
   at least three high speed cameras configured for network communication with at least one server computer, at least one local computing device, and at least one processing facility;
   wherein the at least three high speed cameras are operable to capture two-dimensional (2D) images of a sports participant;
   wherein the at least one processing facility is operable to:
      determine a common timing reference for placing the 2D images of the sports participant;
      calculate respective temporal segment lengths for the 2D images of the sports participant; and
      intertwine the 2D images of the sports participant such that the 2D images of the sports participant are approximately disposed in a temporal sense along the common timing reference.

17. The system of claim 16, wherein the at least one processing facility is operable to develop a mD motion curve for identifiable body parts of the sports participant.

18. The system of claim 17, wherein the at least one processing facility is operable to identify camera frames and/or scan lines from at least two of the at least three high speed cameras that correspond with spatial points along the respective mD motion curve.

19. The system of claim 17, wherein the at least one processing facility is operable to fit the mD motion curve with curve fit optimization techniques relative to the 2D images captured by the at least three high speed cameras where a subset of the 2D images of the at least three high speed cameras is given greater weight due to closeness and/or a better point of view (POV).

20. The system of claim 16, wherein the at least three high speed cameras are configured to automatically determine the start and/or the end of a play action activity and generate a unique ID label for the play action activity.

\* \* \* \* \*